(12) United States Patent
Mizuno et al.

(10) Patent No.: US 8,787,710 B2
(45) Date of Patent: Jul. 22, 2014

(54) WIDEBAND INTERFEROMETER TYPE POLARIZATION LIGHT BEAM COMBINER AND SPLITTER

(75) Inventors: Takayuki Mizuno, Atsugi (JP); Takashi Goh, Atsugi (JP); Hiroshi Yamazaki, Atsugi (JP); Shin Kamei, Atsugi (JP); Tsutomu Kitoh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 352 days.

(21) Appl. No.: 13/321,780

(22) PCT Filed: Jun. 2, 2010

(86) PCT No.: PCT/JP2010/003692
§ 371 (c)(1),
(2), (4) Date: Nov. 21, 2011

(87) PCT Pub. No.: WO2010/140363
PCT Pub. Date: Dec. 9, 2010

(65) Prior Publication Data
US 2012/0063716 A1  Mar. 15, 2012

(30) Foreign Application Priority Data
Jun. 2, 2009 (JP) .................. 2009-133346

(51) Int. Cl.
*G02B 6/26* (2006.01)
(52) U.S. Cl.
USPC .................. 385/11; 385/14; 385/39
(58) Field of Classification Search
None
See application file for complete search history.

(56) References Cited

U.S. PATENT DOCUMENTS

| 5,111,517 A * | 5/1992 | Riviere ............. 385/11 |
| 6,175,668 B1 * | 1/2001 | Borrelli et al. ............. 385/11 |
| 2002/0126933 A1 * | 9/2002 | Goh et al. ............. 385/2 |

(Continued)

FOREIGN PATENT DOCUMENTS

| EP | 1 302 793 | 4/2003 |
| JP | 2002-221630 | 9/2002 |
| JP | 2002-221631 | 9/2002 |
| JP | 2005-010805 | 1/2005 |

OTHER PUBLICATIONS

International Preliminary Report on Patentability and Written Opinion of the International Searching Authority for International Application No. PCT/JP2010/003692 filed Jun. 2, 2010, issued Dec. 6, 2011 (English Translation).

(Continued)

*Primary Examiner* — Mike Stahl
(74) *Attorney, Agent, or Firm* — Workman Nydegger

(57) ABSTRACT

A interferometer type polarization beam combiner and splitter, which can combine or split polarized light over a wide band, is provided. The interferometer type polarization beam combiner and splitter includes: an optical splitter; an optical coupler; an optical path length difference imparting unit, which includes a plurality of optical waveguides arranged between the optical splitting unit and the optical coupling unit; one or two input/output ports connected to the optical splitter; and two input/output ports connected to the optical coupler. A half-integer of a wavelength of $\lambda c$ is set as a normalized phase difference, for the optical path length difference imparting unit, between two polarization states, and means for generating a difference in refractive index dispersion is provided between the optical waveguides of the optical path length difference imparting unit, so that the change rate of the transmittance with respect to wavelength is suppressed for the two polarization states.

16 Claims, 26 Drawing Sheets

(56) References Cited

U.S. PATENT DOCUMENTS

2004/0101227 A1* 5/2004 Takabayashi et al. .......... 385/11
2005/0058386 A1* 3/2005 Little .............................. 385/11
2010/0046886 A1* 2/2010 Doerr ............................. 385/27

OTHER PUBLICATIONS

Ito et al., *Design of a Waveguide-Type Polarized Beam Splitter Incorporating Trenches Filled with Low-Refractive Index Material*, Proceedings of the 14$^{th}$ Annual Conference on Integrated Optics and Technical Exhibition, Eidhoven, The Netherlands, Jun. 11-13, 2008, pp. 399-402, XP002688210.

Ye et al., *Wavelength Independent SOI Polarization Splitter Based on Zero-order Arrayed Waveguide Gratings*, 4$^{th}$ IEEE International Conference on Group IV Photonics—19-21, Tokyo, JP, IEEE, Sep. 19, 2007, pp. 7-9.

Zirngibl, et al., *Polarisation Independent 8 × 8 Waveguide Grating Multiplexer on InP*, Electronics Letters, Stevenage, GB, vol. 29, No. 2, Jan. 21, 1993, two pages, XP000331654, ISSN: 00135794.

Inoue et al, *Novel birefringence compensating AWG design*, Optical Fiber Communication Conference (OFC) Technical Digest Post-conference Edition, Anaheim, CA, Mar. 17-22, 2001, pp. WB4-1 to WB4-3, XP001076361, ISBN: 978-1-557526557.

Lize et al, *Broadband Mach-Zehnder interferometer design using microstructured optical fibers for multi-channel DPSK demodulation*, Optical Fiber Technology, vol. 13, No. 1, Nov. 7, 2006, pp. 85-90, XP005749721, ISSN: 1068-5200.

Extended Search Report from related European Patent Application No. 10783151.3, dated Dec. 12, 2012.

Y. Hashizume, et. al., *Integrated polarisation beam splitter using waveguide birefringence dependence on waveguide with core width*, Electron. Lett. Dec. 2001, vol. 37, No. 25, pp. 1517-1517.

K. Jinguji, et. al., *Two-Port Optical Wavelength Circuits Composed of Cascaded Mach-Zehnder Interferometers with Point-Symmetrical Configurations*, Journal of Lightwave Technology, Oct. 1996, vol. 14, pp. 2301-2310.

* cited by examiner

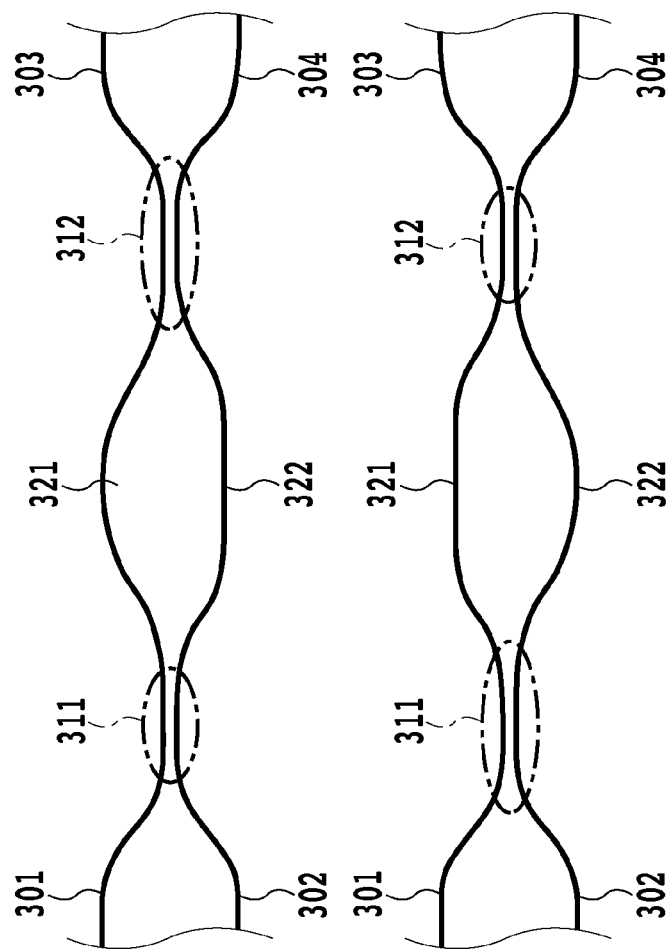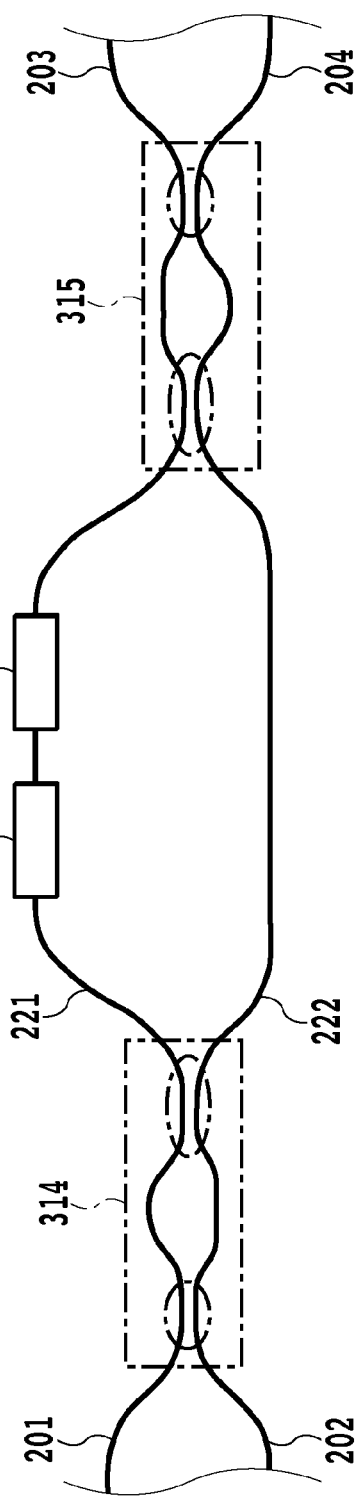
FIG.9A
FIG.9B
FIG.9C

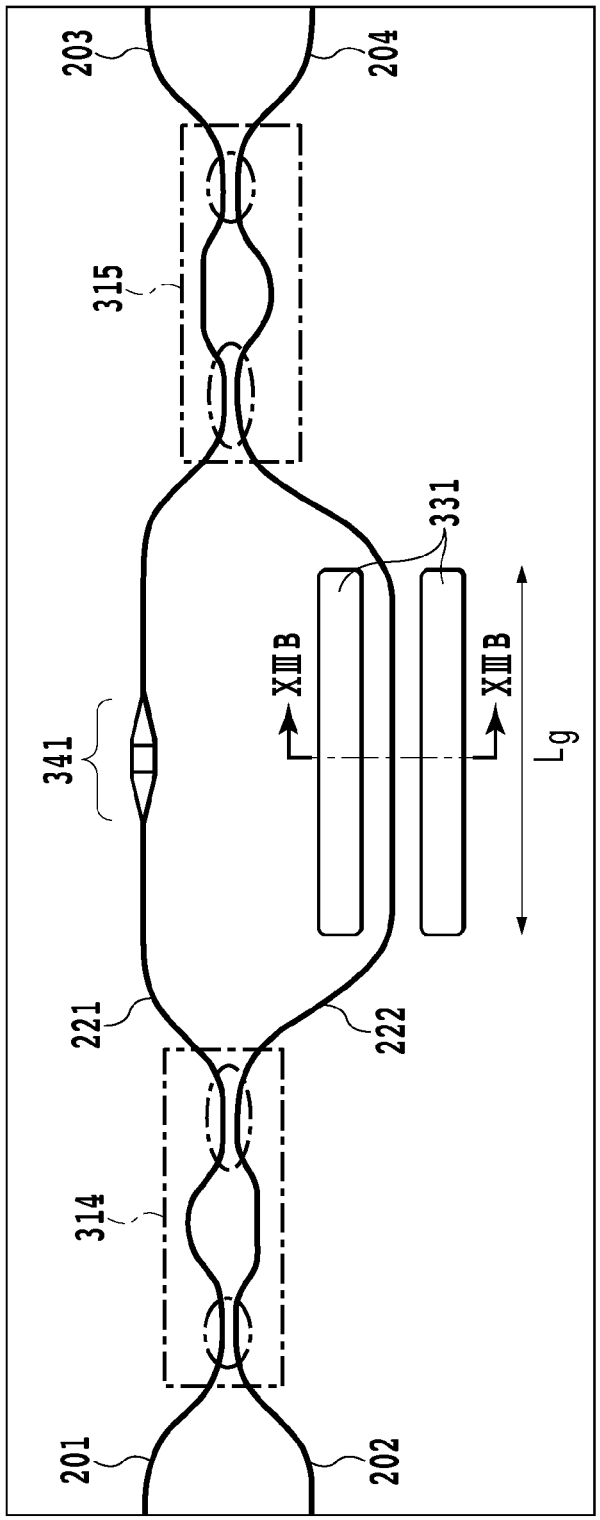
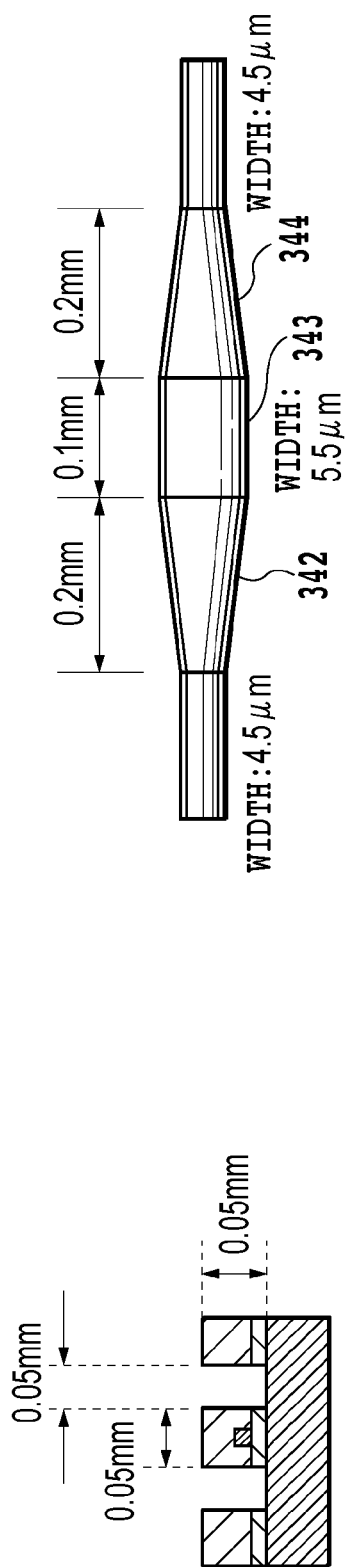
FIG.13A
FIG.13B
FIG.13C

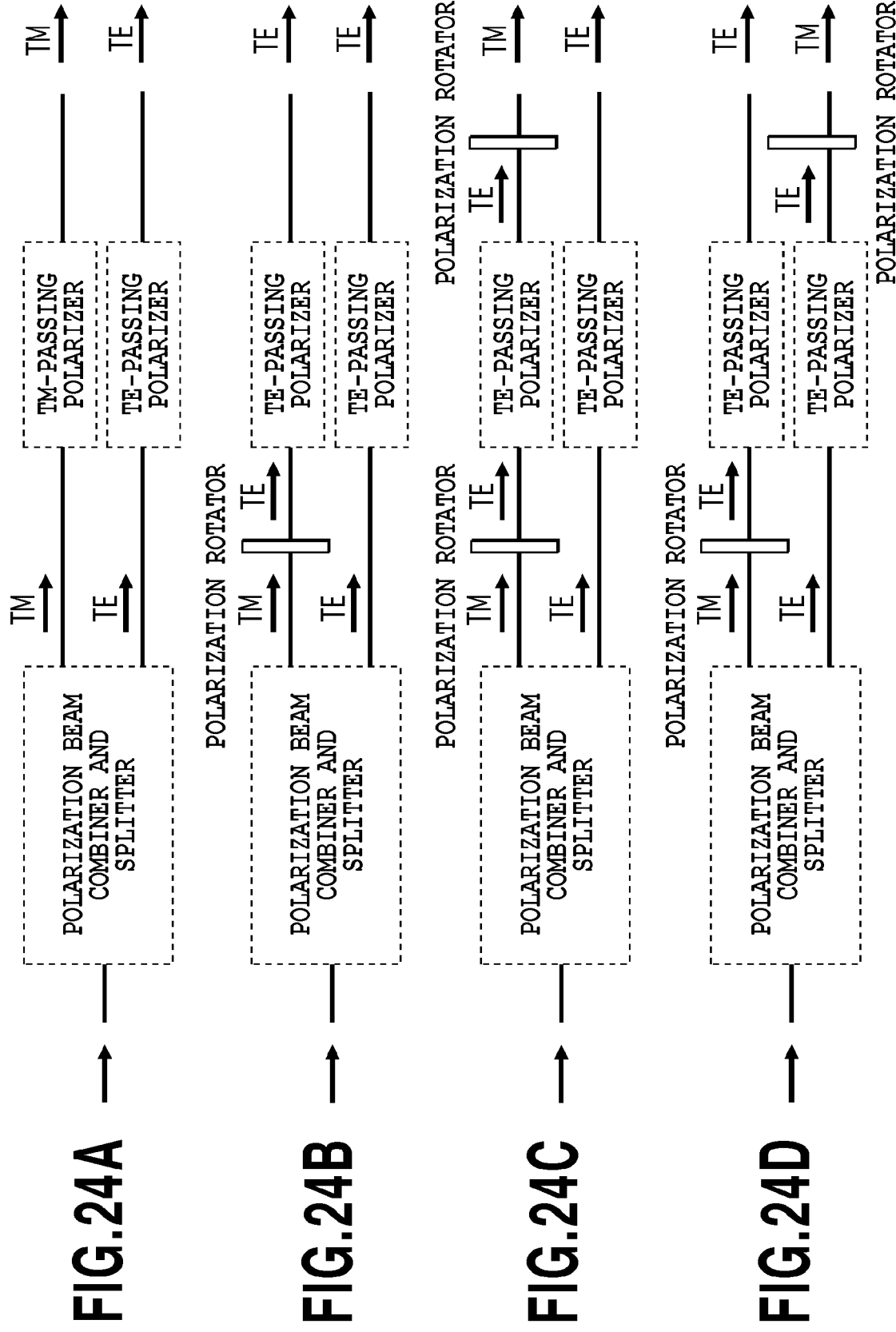

WIDEBAND INTERFEROMETER TYPE POLARIZATION LIGHT BEAM COMBINER AND SPLITTER

TECHNICAL FIELD

The present invention relates to an interferometer type polarization beam combiner and splitter that splits, or combines, polarized light that has been input. More particularly, the present invention relates to a wideband interferometer type polarization beam combiner and splitter that suppresses wavelength dependency by setting, for two polarization states, the same rate at which a transmittance changes relative to a wavelength, and that performs a wideband operation while employing only one interferometer type optical circuit.

BACKGROUND ART

The circuit structure for a conventional interferometer type polarization beam combiner and splitter is shown in FIG. 1 (see patent literature 1). This interferometer type polarization beam combiner and splitter is a Mach-Zehnder interferometer that includes two optical couplers 111 and 112 and two optical waveguides 121 and 122. The operation of the Mach-Zehnder interferometer is changed as follows, depending on an optical path length difference that has been set for the two optical waveguides.

First Conventional Example

In a case wherein a value of 0 is set as the optical path length difference for the two optical waveguides 121 and 122, light input through an input port 101 is output from an output port 104 (a cross port), and is not output from an output port 103 (a through port). Light input through an input port 102 is output from the output port 103 (a cross port), and is not output from the output port 104 (a through port).

In a case wherein a value equivalent to a wavelength $\lambda c/2$, which is half of a wavelength $\lambda c$, is set as the optical path length difference for the two optical waveguides 121 and 122, light input through the input port 101 is output, with a wavelength $\lambda c$, through the output port 103 (a through port), and is not output through the output port 104 (a cross port). Light input through the input port 102 is output, with a wavelength $\lambda c$, through the output port 104 (a through port), and is not output through the output port 103 (a cross port).

Therefore, according to the conventional art, a birefringence index (a difference in the effective refractive indices of TM light and TE light) of $\lambda c/2$ is set for the two optical waveguides 121 and 122. As a result, for example, the optical path length difference for TM light can be set at $\lambda c/2$, while the optical path length difference for TE light is set at 0, and when light is input through the input port 101, TE light and TM light are output through different output ports, so the polarized light can be split at a wavelength $\lambda c$.

As a more specific example, a multi-mode interferometer type optical coupler is employed for an optical splitter and an optical coupler (see non-patent literature 1). An optical path length difference $\Delta L$ between optical waveguides 121 and 122 is set to 0.46 μm. A method for changing the core width of an optical waveguide is employed to control the birefringence of the optical waveguide. An optical waveguide 121 includes a tapered waveguide 131, a linear waveguide 133 and a tapered waveguide 132. The width of the tapered waveguide 131 is changed from 7 μm to 20 μm, the width and the length of linear waveguide 133 are maintained as 20 μm and 5 mm, and the width of the tapered waveguide is changed from 20 μm to 7 μm. An optical waveguide 122 includes a tapered waveguide 141 and a tapered waveguide 142. The width of the tapered waveguide 141 is changed from 7 μm to 20 μm, and the width of the tapered waveguide 142 is changed from 20 μm to 7 μm. Since the portions of the optical path length difference imparting units 121 and 122, which are provided by the tapered waveguides, cancel each other out, the circuit in FIG. 1 is equivalent to a circuit wherein only a linear waveguide having a width of 20 μm and a length of 5 mm is provided for the optical waveguide 121 of the optical path length difference imparting unit.

Second Conventional Example

However, when a manufacturing error occurs, desired properties for polarized beam combining and splitting can not be obtained. Therefore, either birefringence adjustment means can be additionally provided for the two waveguides 121 and 122 of the Mach-Zehnder interferometer to correct errors occurring in the birefringence of the waveguides, or refractive index adjustment means can be additionally provided to correct errors occurring in the refractive indices of the waveguides. An example method employing a thermo-optic phase shifter is disclosed as birefringence adjustment means or refractive index adjustment means (see patent literature 2 or 3). When a thermo-optic phase shifter, used to adjust a birefringence, and a thermo-optic phase shifter, used to adjust a phase, are driven, manufacturing errors can be reduced, and a property close to a desired polarization extinction ratio can be obtained.

CITATION LIST

Patent Literature

[PTL 1] Japanese Patent No. 4102792
[PTL 2] Japanese Patent No. 3703013
[PTL 3] Japanese Patent No. 3715206

Non Patent Literature

[NPL 1] "Integrated polarisation beam splitter using waveguide birefringence dependence on waveguide core width," Y. Hashizume, et. al., Electron. Lett, December, 2001, Vol. 37, no. 25, p. 1517-1518
[NPL 2] "Two-Port Optical Wavelength Circuits Composed of Cascaded Mach-Zehnder Interferometers with Point-Symmetrical Configurations," K. Jinguji, et. al., Journal of Lightwave Technology, October, 1996, vol. 14, p. 2301-2310

SUMMARY OF INVENTION

Technical Problem

According to the polarization beam combiner and splitter for the first conventional example, since the wavelength of polarized light to be combined or split is limited to the vicinity of the wavelength $\lambda c$ of signal light, it could not be operated at a wide wavelength range. According to the second conventional example, since the thermo-optic phase shifter merely adjusts the deterioration of the polarized beam combining/splitting properties based on manufacturing errors, when no manufacturing error is present, this device has no difference with the polarization beam combiner and splitter of the first conventional example.

One objective of the present invention is to extend the operating wavelength range of a polarization beam combiner and splitter that is constructed by an interferometer type optical circuit. As a result, a high-performance interferometer type polarization beam combiner and splitter, which can combine or split polarized light over a wide band, can be provided.

Solution to Problem

According to one embodiment of the present invention, an interferometer type polarization beam combiner and splitter comprises: an optical splitting unit; an optical coupling unit; an optical path length difference imparting unit, which includes a plurality of optical waveguides arranged between the optical splitting unit and the optical coupling unit; one or two input/output ports connected to the optical splitting unit; and two input/output ports connected to the optical coupling unit. The optical path length difference imparting unit includes, along the optical waveguides, means for generating differential birefringence and means for generating a difference in refractive index dispersion, and either polarization combining is performed by inputting light in a first polarization state and light entering in a second polarization state at the two input/output ports, which are connected to the optical coupling unit, and by outputting the light through the one or two input/output ports connected to the optical splitting unit, or polarization splitting is performed by inputting light at the one or two input/output ports, connected to the optical splitting unit, and by outputting light in the first polarization state and light in the second polarization state, respectively, through the two input/output ports that are connected to the optical coupling unit.

According to the embodiment of the present invention, a half-integer of a wavelength of $\lambda c$ is set as a normalized phase difference, for the optical path length difference imparting unit, between the first polarization state and the second polarization state, and wavelength fluctuation of the normalized phase difference is suppressed by difference in refractive index dispersion that is provided by the means for generating a difference in refractive index dispersion.

According to the embodiment of the present invention, the wavelength fluctuation of the normalized phase difference has opposite plus and minus signs for the first polarization state and the second polarization state.

According to the embodiment of the present invention, a sum total of the products of birefringence and path lengths of an optical waveguide with respect to another optical waveguide at an optical path length difference imparting unit can be approximated by $\gamma(\lambda-\lambda c)+(m'+(1/2))\lambda c$.

According to the embodiment of the present invention, when $\psi_1(\lambda)$ is the sum total of the normalized phases of the optical splitting unit, the optical coupling unit, and the optical path length difference imparting unit of the first polarization state, and when $\psi_2(\lambda)$ is the sum total of the normalized phases of the optical splitting unit, the optical coupling unit, and the optical path length difference imparting unit of the second polarization state, the absolute values of the change rate of $\psi_1(\lambda)$ and $\psi_2(\lambda)$ with respect to wavelength are the same and has opposite plus and minus signs.

According to the embodiment of the present invention, the optical splitting unit and the optical coupling unit are wavelength insensitive couplers, each of which includes two directional couplers and an ultra-small optical path length difference imparting unit formed of two optical waveguides arranged between the two directional couplers. The wavelength insensitive couplers employed as the optical splitting unit and the optical coupling unit are arranged point symmetrical with the center of a circuit.

According to the embodiment of the present invention, the optical splitting unit is a Y-branch splitter, the optical coupling unit is an optical coupler, and a splitting ratio for the optical splitting unit and a coupling ratio for the optical coupling unit are 50%, regardless of the wavelength.

According to the embodiment of the present invention, the optical splitting unit is a Y-branch splitter, the optical coupling unit is an optical coupler, the absolute values of the change rate of a normalized phase with respect to wavelength of a first polarization state and a second polarization state of the path length difference imparting unit are the same and has opposite plus and minus signs.

According to the embodiment of the present invention, the means for generating differential birefringence is provided by employing different structures for the optical waveguides of the optical path length difference imparting unit.

According to the embodiment of the present invention, the means for generating differential birefringence is provided by an adjustment of a stress to be applied to the optical waveguides of the optical path length difference imparting unit.

According to the embodiment of the present invention, the means for generating a difference in refractive index dispersion is provided by employing different structures for the optical waveguides of the optical path length difference imparting unit.

According to the embodiment of the present invention, the wideband interferometer type polarization beam combiner and splitter is formed on a planar substrate, and the optical waveguides are silica-based optical waveguides that include core and cladding layers.

Advantageous Effects of Invention

When the present invention is employed, an interferometer type polarization beam combiner and splitter can be provided, which can combine and split polarized light across a wide wavelength range.

BRIEF DESCRIPTION OF DRAWINGS

FIG. 9A is a diagram illustrating a wavelength insensitive coupler (WINC);

FIG. 9B is a diagram illustrating a wavelength insensitive coupler (WINC);

FIG. 9C is a diagram illustrating the circuit structure of an example polarization beam combiner and splitter that employs a WINC as an optical splitter and an optical coupler;

FIG. 13A is a diagram illustrating a wideband interferometer type polarization beam combiner and splitter according to example 1;

FIG. 13B is a cross-sectional view of the wideband interferometer type polarization beam combiner and splitter according to example 1;

FIG. 13C is an enlarged diagram illustrating a width-varying waveguide that is employed for example 1;

FIG. 24A is a schematic diagram illustrating the embodiment of the present invention;

FIG. 24B is a schematic diagram illustrating the embodiment of the present invention;

FIG. 24C is a schematic diagram illustrating the embodiment of the present invention;

FIG. 24D is a schematic diagram illustrating the embodiment of the present invention;

DESCRIPTION OF EMBODIMENTS

Figure 1:
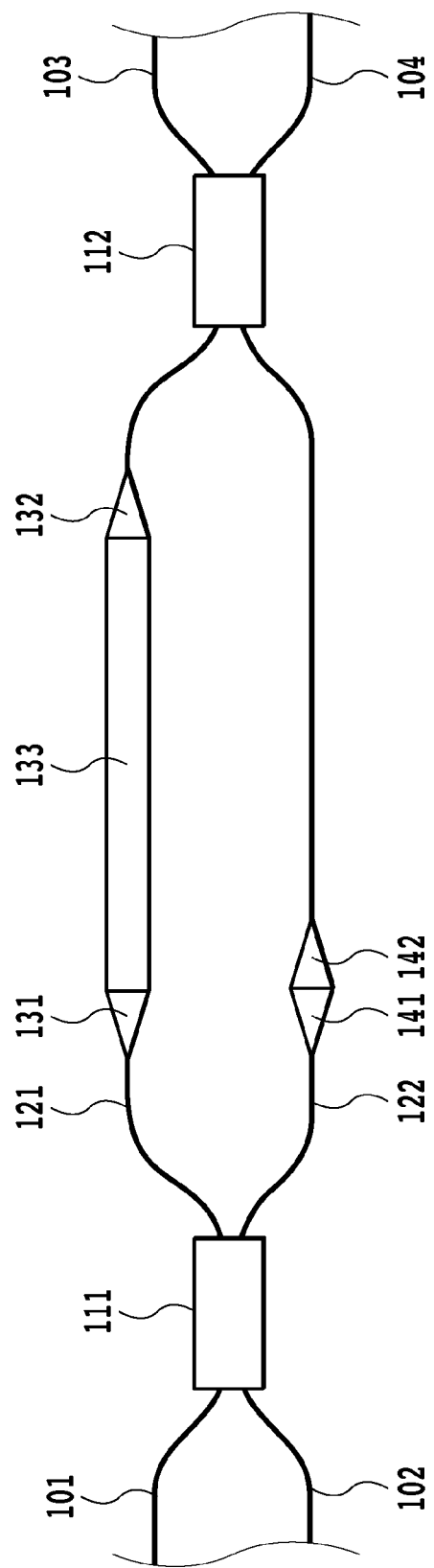
FIG. 1 is a diagram illustrating the circuit structure of a conventional interferometer type polarization beam combiner and splitter.
Figure 2:
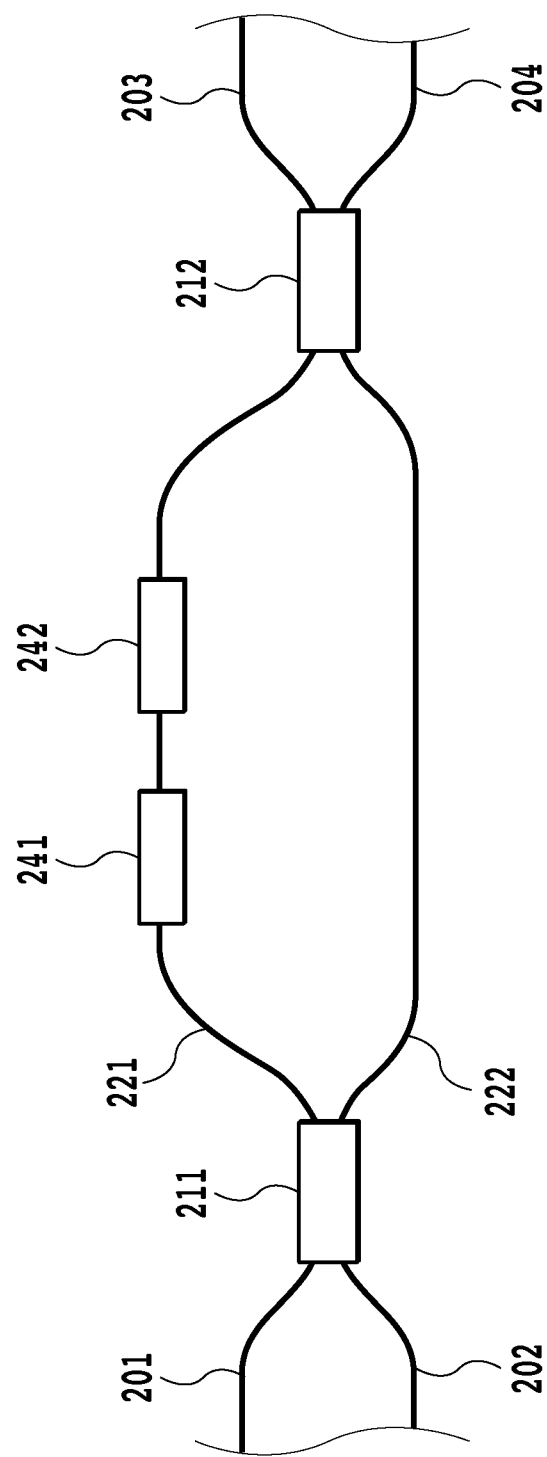
FIG. 2 is a diagram illustrating the circuit structure of a wideband interferometer type polarization beam combiner and splitter according to one embodiment of the present invention.

One embodiment of the present invention will now be specifically described by employing drawings. The circuit structure of a wideband interferometer type polarization beam combiner and splitter according to the present invention is shown in FIG. 2. This circuit is a Mach-Zehnder interferometer type polarization beam combiner and splitter, which includes input/output ports 201, 202, 203 and 204, an optical splitter 211, an optical coupler 212 and an optical path length difference imparting unit formed of two optical waveguides 221 and 222. The optical waveguides 221 and 222 are located between the optical splitter 211 and the optical coupler 212, and the optical path length difference imparting unit includes means 241 for generating differential birefringence and means 242 for generating a difference in refractive index dispersion. In FIG. 2, the means 241 for generating differential birefringence and the means 242 for generating a difference in refractive index dispersion are provided along the same optical waveguide; however, the means 241 for generating differential birefringence and the means 242 for generating a difference in refractive index dispersion may be located along different optical waveguides. It is assumed that TE light is a polarization state 1 and TM light is a polarization state 2, and the means 241 for generating differential birefringence is employed so that, in the optical path length difference imparting unit, a normalized phase difference between the TE light and the TM light is set as m'+(½), at a wavelength λc (m' is an integer). Further, when the means 242 for generating a difference in refractive index dispersion is employed to suppress a wavelength fluctuation of the normalized phase difference, wavelength dependency can be suppressed for the polarization states 1 and 2 to perform polarization combining, or polarization splitting.

Figure 3:
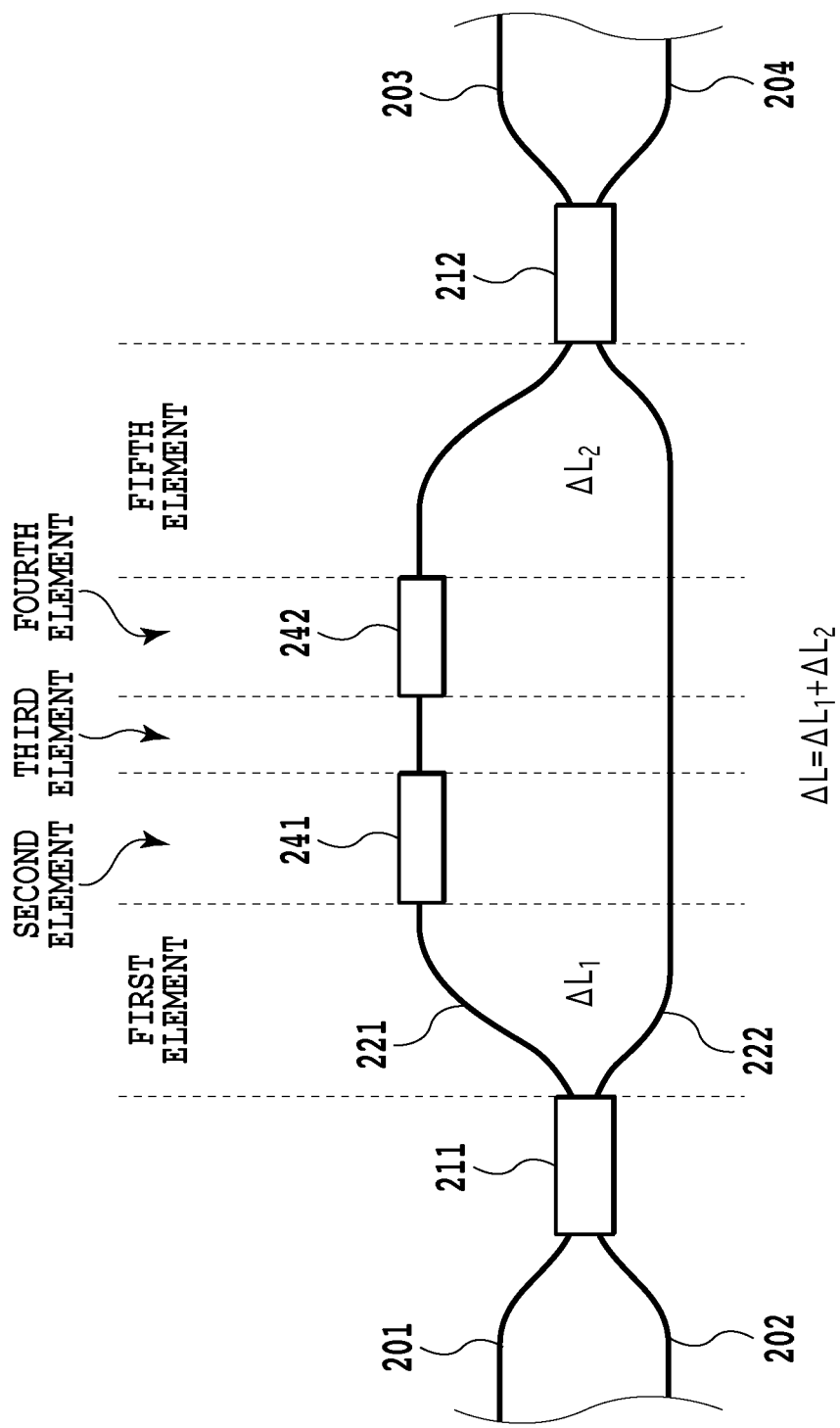
FIG. 3 is a diagram illustrating the state, for the wideband interferometer type polarization beam combiner and splitter of the embodiment of the present invention, wherein the optical path length difference imparting unit is divided into five elements.

This will be described more specifically by employing equations. Assume that the optical path length difference imparting unit is divided into individual component segments, as shown in FIG. 3. Here, $n_{aTE,i}(\lambda)$ and $n_{aTM,i}(\lambda)$ denote the effective refractive indexes of TE light (polarization state 1) and TM light (polarization state 2) along the optical waveguide 221 of the i-th segment of the optical path length difference imparting unit, and $n_{bTE,i}(\lambda)$ and $n_{bTM,i}(\lambda)$ denote the effective refractive indexes of TE light and TM light along the optical waveguide 222 of the i-th segment of the optical path length difference imparting unit. In this case, birefringence $B_{a,i}(\lambda)$ for the optical waveguide 221 at the i-th segment of the optical path length difference imparting unit, and birefringence $B_{b,i}(\lambda)$ for the optical waveguide 222 at the i-th segment of the optical path length difference imparting unit, are represented by the following equations.

[Expression 1]

$$B_{a,i}(\lambda) = n_{aTM,i}(\lambda) - n_{aTE,i}(\lambda) \tag{1}$$

[Expression 2]

$$B_{b,i}(\lambda) = n_{bTM,i}(\lambda) - n_{bTE,i}(\lambda) \tag{2}$$

To simplify the description, the phases for the optical splitter 211 and the optical coupler 212 are disregarded, and only the phase for the optical path length difference imparting unit is taken into account. In the optical path length difference imparting unit, the relative normalized phases of TE light and TM light for the optical waveguide 221, relative to the optical waveguide 222, are represented by the following equations.

[Expression 3]

$$\varphi_{TE}(\lambda) = \frac{1}{\lambda} \sum_i (n_{aTE,i}(\lambda) \cdot L_{a,i} - n_{bTE,i}(\lambda) \cdot L_{b,i}) \tag{3}$$

[Expression 4]

$$\varphi_{TM}(\lambda) = \frac{1}{\lambda} \sum_i (n_{aTM,i}(\lambda) \cdot L_{a,i} - n_{bTM,i}(\lambda) \cdot L_{b,i}) \tag{4}$$

$$= \varphi_{TE}(\lambda) + \frac{1}{\lambda} \sum_i (B_{a,i}(\lambda) \cdot L_{a,i} - B_{b,i}(\lambda) \cdot L_{b,i})$$

It should be noted that $L_{a,i}$ is the length of the optical waveguide 221 at the i-th segment, $L_{b,i}$ is the length of the optical waveguide 222 at the i-th segment and λ is a wavelength. Furthermore, a delay at the optical path length difference imparting unit is represented as $\exp(-i \cdot 2\# \cdot \phi)$, and since a phase is normalized using $2\pi$, this is described as a normalized phase.

When this device is to be operated as a polarization beam combiner and splitter, first, it is required that a normalized phase difference between TE light and TM light be m'+(½), with the center wavelength λc in a waveband to be employed (m' is an integer).

[Expression 5]

$$\varphi_{TM}(\lambda) = \varphi_{TE}(\lambda) + \left(m' + \frac{1}{2}\right) \tag{5}$$

Defining a function H(λ), it is represented by the following equation.

[Expression 6]

$$H(\lambda) \equiv \sum_i (B_{a,i}(\lambda) \cdot L_{a,i} - B_{b,i}(\lambda) \cdot L_{b,i}) = \lambda \cdot \left(m' + \frac{1}{2}\right) \tag{6}$$

When a circuit is designed to satisfy the above conditional equation, the circuit in the vicinity of the wavelength λc of signal light functions as a polarization beam combiner and splitter.

A requirement for the expansion of a bandwidth will now be described. For TE light and TM light, the rates of change for a normalized phase, with wavelength, are respectively represented as follows.

[Expression 7]

$$\frac{\partial \varphi_{TE}(\lambda)}{\partial \lambda} \equiv G(\lambda) \tag{7}$$

[Expression 8]

$$\frac{\partial \varphi_{TM}(\lambda)}{\partial \lambda} = G(\lambda) - \frac{H(\lambda)}{\lambda^2} + \frac{1}{\lambda} \cdot \frac{\partial H(\lambda)}{\partial \lambda} \tag{8}$$

Since the change rate relative to a wavelength must be minimized in order to reduce wavelength dependency, the condition for the expansion of a bandwidth is represented as:

[Expression 9]

$$\frac{\partial \varphi_{TE}(\lambda)}{\partial \lambda} + \frac{\partial \varphi_{TM}(\lambda)}{\partial \lambda} = 0 \qquad (9)$$

That is, when the change in wavelength of the normalized phases of the TE light and TM light with respect to wavelength has opposite plus and minus signs, the wavelength dependency can be reduced. Since it is more preferable to set $\partial \varphi_{TE}(\lambda)/\partial\lambda = -(\partial \varphi_{TM}(\lambda)/\partial\lambda)$, the wavelength dependency can be suppressed most effectively when the absolute values of the change rate of a normalized phase with respect to wavelength of a TE light and TM light are the same and has opposite plus and minus signs.

The conditional equation described above can be interpreted as follows. Since for the Mach-Zehnder interferometer type polarization beam combiner and splitter it is required that a difference between the normalized phases $\phi_1(\lambda)$ and $\phi_2(\lambda)$ in the polarization state 1 and the polarization state 2 be m'+(½) (m' is an integer), an optical path length difference of at least half a wavelength must be provided for the optical path length difference imparting unit. For example, assume that the optical path length difference in the polarization state 1 is 0 and the optical path length difference in the polarization state 2 is λc/2. In this case, the optical path length difference for the optical path length difference imparting unit in the polarization state 1 is 0, and wavelength dependency does not occur. However, the optical path length difference for the optical path length difference imparting unit in the polarization state 2 is finite, and wavelength dependency occurs. In the polarization beam combiner and splitter that combines or splits beams in the polarization state 1 and in the polarization state 2, it is preferable that a loss at a transmission port be low and that a polarization extinction ratio at a cutoff port be high in not either the polarization state 1 or the polarization state 2 but both the polarization state 1 and the polarization state 2. For the polarization state 1 and the polarization state 2, the average wavelength dependency becomes minimum in a case wherein the absolute values of the change rate of a normalized phase with respect to wavelength of a TE light and TM light are the same and has opposite plus and minus signs. This can be interpreted as a condition wherein an optical path length difference required for operating the device as a polarization beam combiner and splitter is divided into two, for the polarization state 1 and the polarization state 2, so as to equally impose wavelength dependency on the two states.

Based on equations (7), (8) and (9), G(λ) is

[Expression 10]

$$G(\lambda) = \frac{1}{2\cdot\lambda}\left(\frac{H(\lambda)}{\lambda} - \frac{\partial H(\lambda)}{\partial \lambda}\right) \qquad (10)$$

Assume H(λ) is represented as follows (0≤γ≤0.5).

[Expression 11]

$$H(\lambda) = \gamma(\lambda - \lambda_C) + \left(m' + \frac{1}{2}\right)\lambda_C \qquad (11)$$

When equation (11) is substituted into equation (10), the rate of change for a normalized phase with wavelength are represented for TE light and TM light by the following modified equations.

[Expression 12]

$$\frac{\partial \varphi_{TE}(\lambda)}{\partial \lambda} = \frac{\lambda_C}{4\cdot\lambda^2}(1 + 2\cdot m' - 2\cdot\gamma) \qquad (12)$$

[Expression 13]

$$\frac{\partial \varphi_{TM}(\lambda)}{\partial \lambda} = -\frac{\lambda_C}{4\cdot\lambda^2}(1 + 2\cdot m' - 2\cdot\gamma) \qquad (13)$$

The normalized phases of TE light and TM light are obtained by integrating these equations.

[Expression 14]

$$\varphi_{TE}(\lambda) = \int G(\lambda)\cdot d\lambda \qquad (14)$$
$$= \left(\frac{m}{2} - \frac{1+2\cdot\gamma}{4}\right) - \frac{\lambda_C}{4\cdot\lambda}(1 + 2\cdot m' - 2\cdot\gamma)$$

[Expression 15]

$$\varphi_{TM}(\lambda) = \left(\frac{m}{2} - \frac{1-2\cdot\gamma}{4}\right) - \frac{\lambda_C}{4\cdot\lambda}(2\cdot\gamma - 2\cdot m' - 1) \qquad (15)$$

Therefore, based on equations (3) and (4), the following equations are established.

[Expression 16]

$$\sum_i (B_{a,i}(\lambda)\cdot L_{a,i} - B_{b,i}(\lambda)\cdot L_{b,i}) = \gamma\cdot(\lambda - \lambda_C) + \left(m' + \frac{1}{2}\right)\lambda_C \qquad (16)$$

[Expression 17]

$$\sum_i (n_{aTE,i}(\lambda)\cdot L_{a,i} - n_{bTE,i}(\lambda)\cdot L_{b,i}) = \qquad (17)$$
$$\frac{1}{2}\left(m - \frac{1}{2} - \gamma\right)\cdot\lambda - \frac{(1 + 2\cdot m' - 2\cdot\gamma)\cdot\lambda_C}{4}$$

When the interferometer type polarization beam combiner and splitter is set to satisfy the two conditional equations described above, the wideband interferometer type polarization beam combiner and splitter of the present invention can be provided.

Figure 4A:
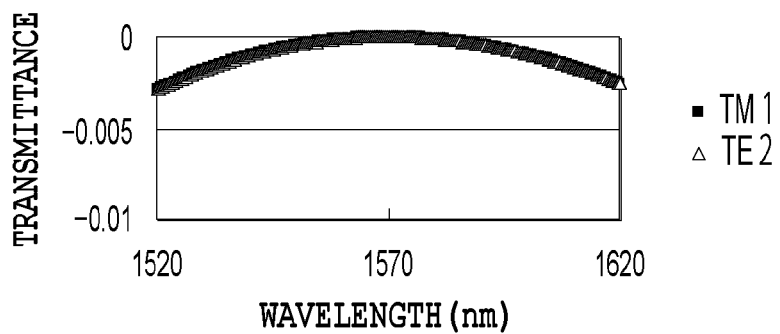
FIG. 4A is a graph showing a transmission property, obtained for the wideband interferometer type polarization beam combiner and splitter of the embodiment of the present invention.
Figure 4B:
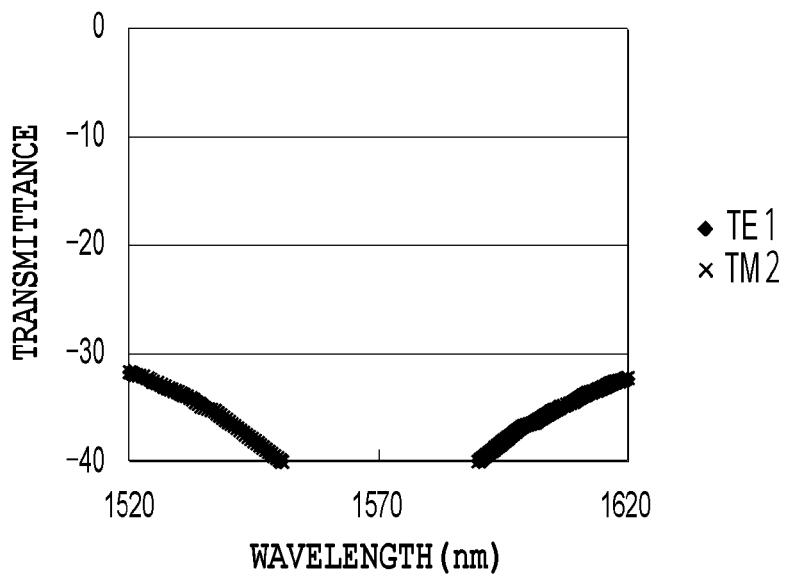
FIG. 4B is a graph showing a cutoff property, obtained for the wideband interferometer type polarization beam combiner and splitter of the embodiment of the present invention.
Figure 4C:
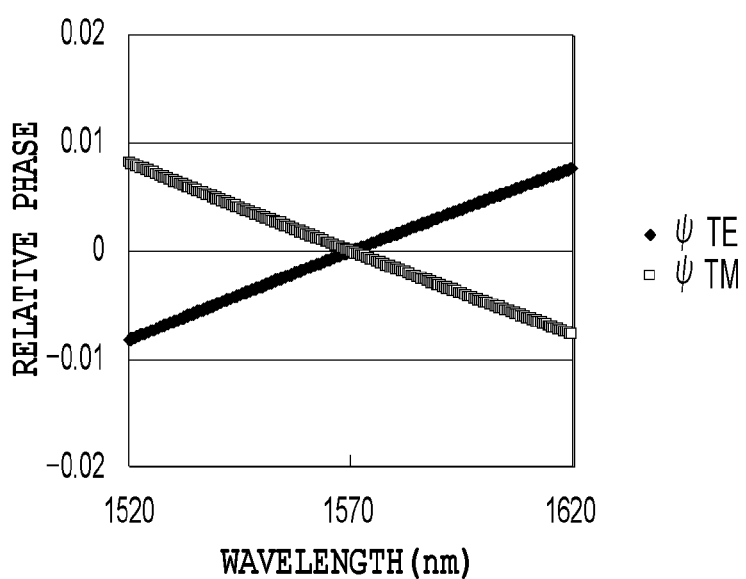
FIG. 4C is a graph showing wavelength dependency of a relative phase, obtained for the wideband interferometer type polarization beam combiner and splitter of the embodiment of the present invention.

The transmission property of the wideband interferometer type polarization beam combiner and splitter obtained for this embodiment is shown in FIG. 4. An insertion loss is small (FIG. 4A) and a polarization extinction ratio is high (FIG. 4B) across a wide range of wavelengths. The relative normalized phases are shown in FIG. 4. It is apparent from FIG. 4C that, for TE light and TM light, the rate of change for a normalized phase with wavelength is equal, but with the signs reversed.

The function defined by equation (11) is merely an example, and another mathematical equation can be employed, or another function, such as a high-order function higher than second order with respect to wavelength, may be employed. When a different function is employed, accordingly, equations (16) and (17), which are conditional equations, are also changed. In this case, simply the optical conditional equations need be calculated using the above described method, which is the feature of the present invention.

Figure 5:
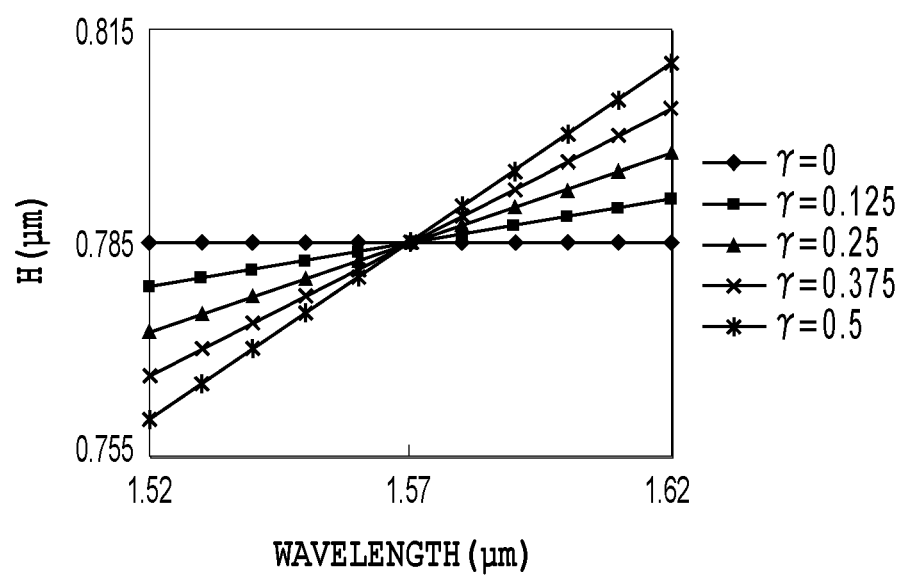
FIG. 5 is a graph showing wavelength dependency of a function H(λ) provided by equation (11)
Figure 6A:
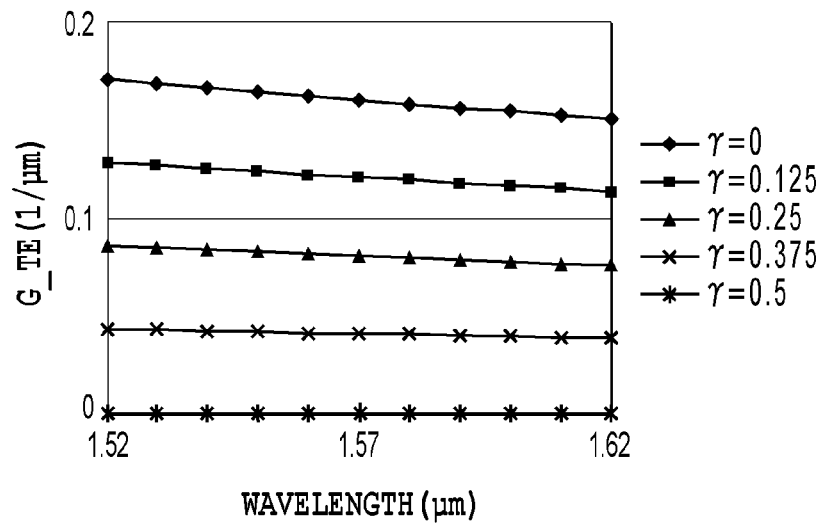
FIG. 6A is a graph showing wavelength dependency (in a TE light case) of the rate of change for a normalized phase, provided by equations (12) and (13)
Figure 6B:
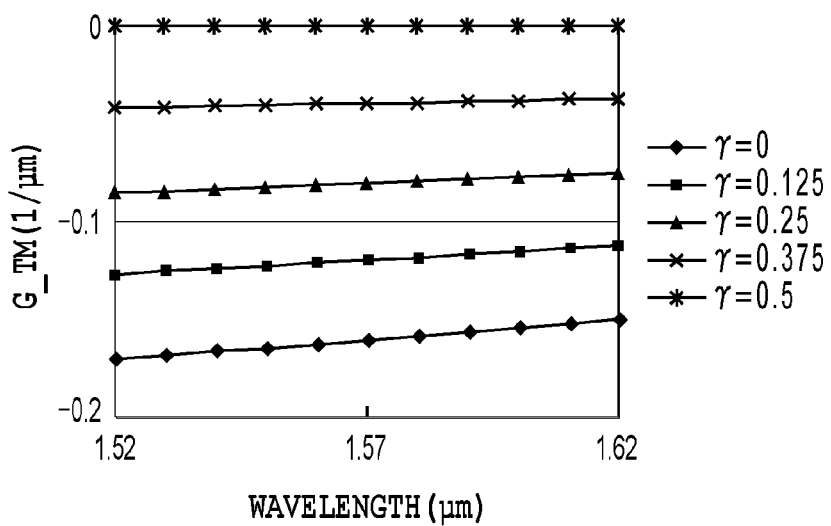
FIG. 6B is a graph showing wavelength dependency (in a TM light case) of the rate of change for a normalized phase, provided by equations (12) and (13)
Figure 7A:
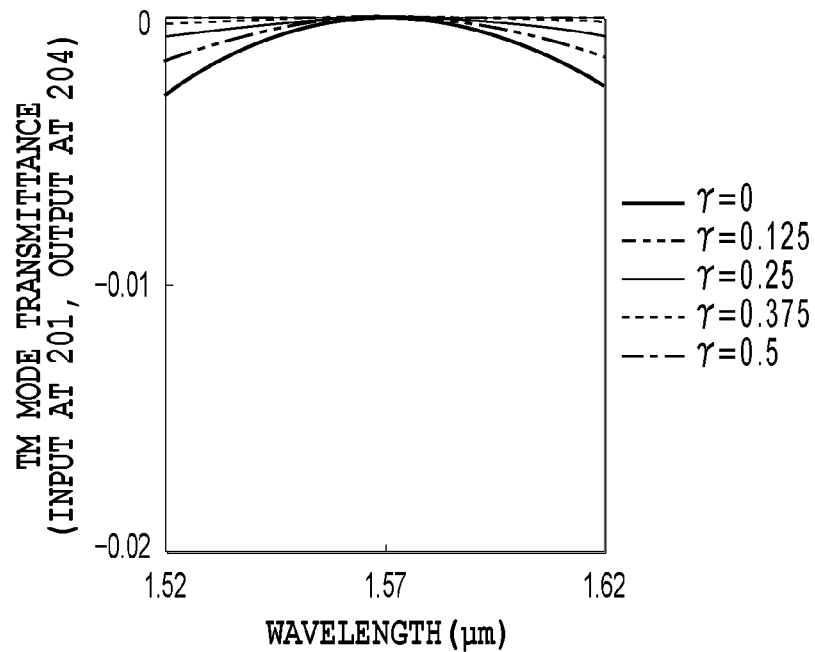
FIG. 7A is a graph showing the transmission property of the interferometer type polarization beam combiner and splitter, relative to different values of γ.
Figure 7B:
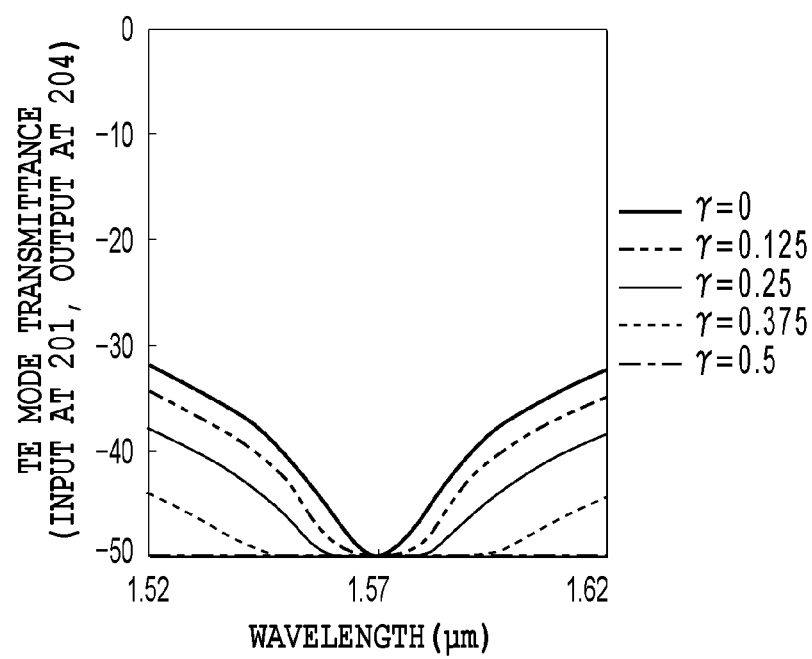
FIG. 7B is a graph showing the cutoff property of the interferometer type polarization beam combiner and splitter, relative to different values of γ.

It is indicated that, at the wavelength λc, the function defined by equation (11) becomes equal to equation (6), and in the vicinity of the wavelength λc of signal light, the device begins to serve as the polarization beam combiner and splitter. In equation (11), γ indicates a parameter for the wavelength dependency of birefringence, and generally, when there is no wavelength dependency in birefringence, γ=0 can be set. When there is wavelength dependency in birefringence, a finite value is set for γ; however, when γ is employed in equation (11), the wavelength dependency of birefringence can be employed to obtain a further improvement in the wavelength dependency. The wavelength dependency of H, which is defined by equation (11), is shown in FIG. 5; the wavelength dependency of the rate of change of a normalized phase, provided by equations (12) and (13), is shown in FIG. 6; and the transmission property of the interferometer type polarization beam combiner and splitter is shown in FIG. 7. It is apparent that as a value γ=0 nears γ=0.5, the rate of change of a normalized phase is smaller, and the wavelength dependency is reduced. This is a characteristic that is not provided by a conventional polarization beam combiner and splitter. When the parameter γ is set as γ=0.5, the wavelength insensitive condition can be obtained both for the polarization state 1 and the polarization state 2, based on equations (12) and (13). As described above, when the parameter γ is employed and its value is adjusted within a range of 0<γ≤0.5, the wavelength dependency of birefringence can also be utilized, and the wavelength dependency can be reduced more than simply distributing the wavelength dependency into the polarization state 1 and the polarization state 2.

In this case, since acquisition of the basic conditional equation is focused on, the phases of the optical splitter and the optical coupler are disregarded; however, for the actual circuit design, the setting for the optical path length difference imparting unit is changed in accordance with the phases of an optical splitter and an optical coupler that are employed. Specifically, $\phi_1(\lambda)$ and $\phi_2(\lambda)$ in the previously described equations must be replaced with $\psi_1(\lambda)$ and $\psi_2(\lambda)$. It should be noted that $\psi_1(\lambda)$ represents the sum of normalized phases in the polarization state 1 for the optical splitter, the optical coupler and the optical path length difference imparting unit, and $\psi_2(\lambda)$ represents the sum of normalized phases in the polarization state 2 for the optical splitter, the optical coupler and the optical path length difference imparting unit. One example set employed for the optical splitter and the optical coupler will be given below.

<Case of an Optical Splitter: a Directional Coupler and an Optical Coupler: a Directional Coupler>

Figure 8A:
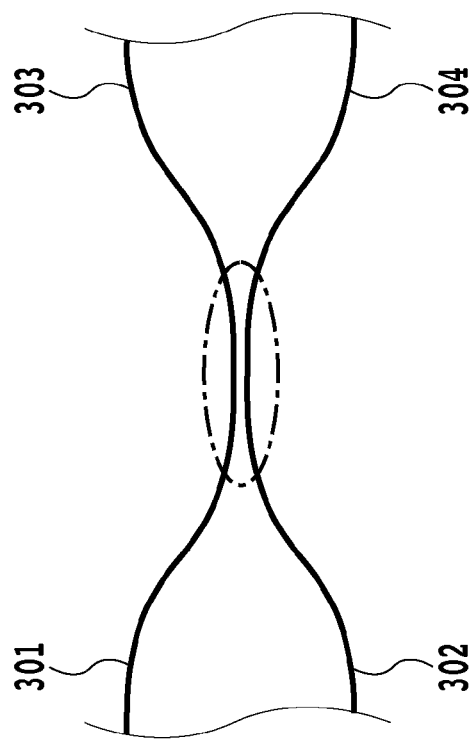
FIG. 8A is a diagram illustrating a two-input/two-output directional coupler that includes two optical waveguides located near each other.
Figure 8B:
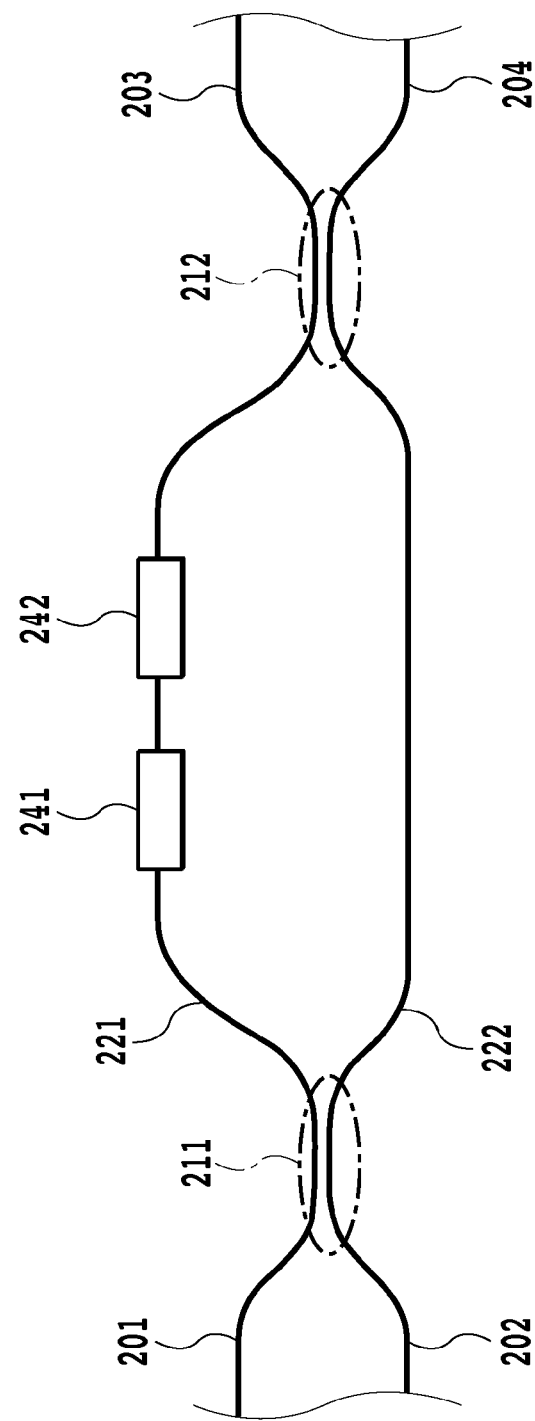
FIG. 8B is a diagram illustrating the circuit structure of an example polarization beam combiner and splitter that employs directional couplers as an optical splitter and an optical coupler.

As one example, directional couplers are employed as an optical splitter and an optical coupler, as shown in FIG. 8B. As shown in FIG. 8A, these directional couplers are 2-input/2-output directional couplers that include two optical waveguides located near each other. Assuming that the split ratio/coupling ratio of the directional coupler is $\gamma(\lambda)$, a transfer function for the through port of the directional coupler (i.e., a case in FIG. 8A wherein a signal is to be input at a port 301 and output at a port 303, or is to be input at a port 302 and output at a port 304) is provided as

[Expression 18]

$$\sqrt{1-r(\lambda)}$$

A transfer function for the cross port of the directional coupler (i.e., a case in FIG. 8A wherein a signal is to be input at the port 301 and output at the port 304, or is to be input at the port 302 and output at the port 303) is provided as

[Expression 19]

$$\sqrt{r(\lambda)}\cdot\exp(-i\cdot\pi/2)$$

This indicates that light that passed through the cross port of the directional coupler has a phase retardation of π/2 (a retardation in normalized phase of ¼) relative to light that passed through the through port (the light that passed through the through port has an advance in phase of π/2 (an advance in normalized phase of ¼) relative to the light that passed through the cross port). Therefore, in a case wherein light is to be input at port 201 in FIG. 8B and be output at port 203, along the route passing through the optical waveguide 221 the light travels through the through port of the directional coupler twice, while along the route passing the optical waveguide 222, the light travels through the cross port twice. As a result, the additional, relative normalized phases provided by the optical splitter and the optical coupler are −½. Whereas, in a case wherein light is to be input at the port 201 and be output at the port 204, the light travels through the through port and the cross port of the directional coupler one time each, regardless of which route is employed, either the one for the optical waveguide 221 or the optical waveguide 222. Therefore, the phases provided by the optical splitter 211 and the optical coupler 212 cancel out each other. As a conclusion, when light is input at the port 201 and is output at the ports 203 and 204, the relative normalized phases of TE light and TM light are represented as

[Expression 20]

$$\psi_{TE,201 \Rightarrow 203}(\lambda) = \phi_{TE}(\lambda) + (-\tfrac{1}{2}) \qquad (18)$$

[Expression 21]

$$\psi_{TE,201 \Rightarrow 204}(\lambda) = \phi_{TE}(\lambda) \qquad (19)$$

[Expression 22]

$$\psi_{TM,201 \Rightarrow 203}(\lambda) = \phi_{TM}(\lambda) + (-\tfrac{1}{2}) \qquad (20)$$

[Expression 23]

$$\psi_{TM,201 \Rightarrow 204}(\lambda) = \phi_{TM}(\lambda) \qquad (21)$$

The condition for expansion of a bandwidth is either

[Expression 24]

$$(\partial \psi_{TE,201 \Rightarrow 204}(\lambda)/\partial\lambda) + (\partial \psi_{TM,201 \Rightarrow 203}(\lambda)/\partial\lambda) = 0 \qquad (22)$$

or

[Expression 25]

$$(\partial \psi_{TE,201 \Rightarrow 203}(\lambda)/\partial\lambda) + (\partial \psi_{TM,201 \Rightarrow 204}(\lambda)/\partial\lambda) = 0 \qquad (23)$$

When equations (18), (19), (20) and (21) are substituted into these equations, they are equal to equation (9). Therefore, in this example, when the interferometer type polarization beam combiner and splitter is set to satisfy equations (16) and (17), the wideband interferometer type polarization beam combiner and splitter of this invention can be obtained. This can be also applied for a case wherein light is to be input at the port 202. Specifically, when light is to be input at the port 202 and output at the port 204, the additional, relative normalized phases provided by the optical splitter 211 and the optical coupler 212 need only be replaced with ½.

<Case of an Optical Splitter: a Wavelength Insensitive Coupler (WINC) and an Optical Coupler: a Wavelength Insensitive Coupler (WINC)>

As another example, wavelength insensitive couplers (WINC) are employed as the optical splitter and the optical coupler, as shown in FIG. 9C. As shown in FIG. 9A, the WINC includes input/output ports 301, 302, 303 and 304; a directional coupler 311 that serves as an optical splitter; a directional coupler 312 that serves as an optical coupler; and an ultra-small optical path length difference imparting unit, which is formed of two optical waveguides 321 and 322 arranged between the two directional couplers. The WINC 314 serving as an optical splitter is arranged in a direction as shown in FIG. 9A, and the WINC 315 serving as an optical coupler is arranged in a direction as shown in FIG. 9B, so that these WINC 314 and 315 are point symmetrically positioned at the circuit center of the Mach-Zehnder interferometer type polarization beam combiner and splitter (FIG. 9C). The WINCs may be located in arbitrary directions; in this case, however, the wavelength dependency of a phase difference generated in the WINCs should be taken into account when designing a circuit. The symmetrical arrangement for the WINCs is employed in the above case, because the phase differences generated in the WINCs can be cancelled by each other, and the circuit design can be simplified. A transfer function employed when a signal is to be input at a port 301 of the WINC in FIG. 9A and to be output at a port 303, a transfer function employed when a signal is to be input at the port 301 and output at the port 304, a transfer function employed when a signal is to be input at the port 302 and output at the port 303, and a transfer function employed when a signal is to be input at the port 302 and output at the port 304 are represented respectively as $a(\lambda)$, $b(\lambda)$, $-b^*(\lambda)$ and $a^*(\lambda)$. A transfer function employed when a signal is to be input at a port 301 of the WINC in FIG. 9B and to be output at a port 303, a transfer function employed when a signal is to be input at the port 301 and output at the port 304, a transfer function employed when a signal is to be input at the port 302 and output at the port 303, and a transfer function employed when a signal is to be input at the port 302 and output at the port 304 are represented respectively as $a^*(\lambda)$, $b(\lambda)$, $-b^*(\lambda)$ and $a(\lambda)$. (* represents a complex conjugation; see non-patent literature 2). With this arrangement, the phases that appeared at the cross port are the same as for a case wherein directional couplers are employed, and further, the phases at the through port cancel each other to establish $\phi(\lambda)=\phi(\lambda)$. Thus, also in this case, when the interferometer type polarization beam combiner and splitter is set so as to satisfy equations (16) and (17), the wideband interferometer type polarization beam combiner and splitter of the present invention can be obtained. Compared with the splitting ratio/coupling ratio of the directional coupler that are affected by wavelength dependency, the splitting ratio and the coupling ratio of the WINC can be set to 50%, regardless of the wavelength, so that a superior property is often obtained with this arrangement when a high extinction ratio is desired over a large wavelength range.

<Case of an Optical Splitter: a Y-Branch Splitter and an Optical Coupler: a WINC>

Figure 10A:
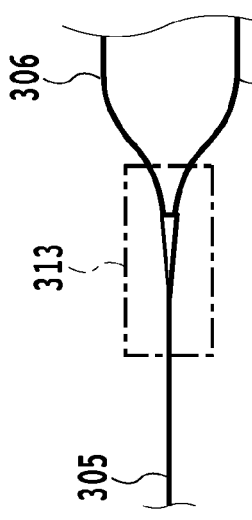
FIG. 10A is a diagram illustrating a Y-branch splitter.
Figure 10B:
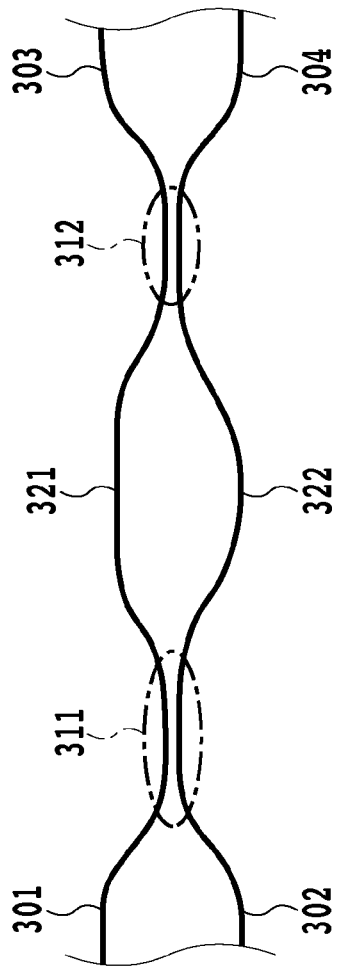
FIG. 10B is a diagram illustrating a wavelength insensitive coupler (WINC)
Figure 10C:
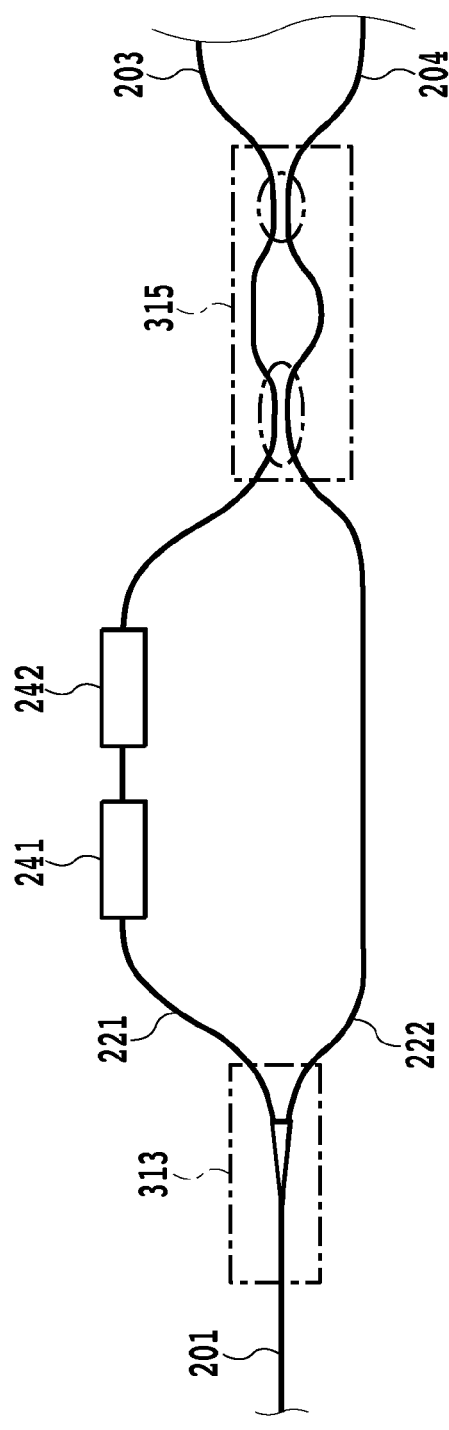
FIG. 10C is a diagram illustrating the circuit structure of an example polarization beam combiner and splitter that employs a Y-branch splitter as an optical splitter and a WINC as an optical coupler.

As yet another example, a Y-branch splitter is employed as an optical splitter and a WINC is employed as an optical coupler, as shown in FIG. 10C. The Y-branch splitter is connected to input/output ports 305, 306 and 307, as shown in FIG. 10A. The WINC is a wavelength insensitive coupler that includes, as shown in FIG. 10B, input/output ports 301, 302, 303 and 304, a directional coupler 311 that serves as an optical splitter, a directional coupler 312 that serves as an optical coupler, and an ultra-small optical path length difference imparting unit that is formed of two optical waveguides 321 and 322 located between the two directional couplers. In this case, the splitting ratio of the Y-branch splitter and the coupling ratio of the WINC are set as 50%, regardless of the wavelength. A transfer function employed when a signal is to be input at the port 301 of the WINC in FIG. 10B and to be output at the port 303, a transfer function employed when a signal is to be input at the port 301 and output at the port 304, a transfer function employed when a signal is to be input at the port 302 and output at the port 303, and a transfer function employed when a signal is to be input at the port 302 and output at the port 304 are represented respectively as $a(\lambda)$, $b(\lambda)$, $-b^*(\lambda)$ and $a^*(\lambda)$. Assume that a normalized phase is

[Expression 26]

$$\phi(\lambda) \equiv \{\arg[a(\lambda)] - \arg[-b^*(\lambda)]\}/2\pi$$

In this case, when light is to be output through the output port 203 of this Mach-Zehnder type polarization beam combiner and splitter, a phase provided by the optical coupler is represented by $-\{\arg[a(\lambda)] - \arg[-b^*(\lambda)]\}/2\pi = -\phi(\lambda)$, and when light is to be output through the output port 204, a phase provided by the optical coupler is represented by $\{\arg[a^*(\lambda)] - \arg[b(\lambda)]\}/2\pi = -[\phi(\lambda) + (½)]$. Therefore, when light is to be input at the port 201 and output at the ports 203 and 204, relative normalized phases of TE polarized light and TM polarized light are represented by

[Expression 27]

$$\psi_{TE,201 \Rightarrow 203}(\lambda) = \phi_{TE}(\lambda) + [-\phi(\lambda)] \tag{24}$$

[Expression 28]

$$\psi_{TE,201 \Rightarrow 204}(\lambda) = \phi_{TE}(\lambda) + \{-[\phi(\lambda) + (½)]\} \tag{25}$$

[Expression 29]

$$\psi_{TM,201 \Rightarrow 203}(\lambda) = \phi_{TM}(\lambda) + [-\phi(\lambda)] \tag{26}$$

[Expression 30]

$$\psi_{TE,201 \Rightarrow 204}(\lambda) = \phi_{TM}(\lambda) + \{-[\phi(\lambda) + (½)]\} \tag{27}$$

A condition for expansion of a bandwidth is either

[Expression 31]

$$(\partial \psi_{TE,201 \Rightarrow 203}(\lambda)/\partial\lambda) + (\partial \psi_{TM,201 \Rightarrow 204}(\lambda)/\partial\lambda) = 0 \tag{28}$$

or

[Expression 32]

$$(\partial \psi_{TE,201 \Rightarrow 203}(\lambda)/\partial\lambda) + (\partial \psi_{TM,201 \Rightarrow 204}(\lambda)/\partial\lambda) = 0 \tag{29}$$

For example, in the case for the condition represented by equation (28), the following equation is established.

[Expression 33]

$$\partial[\phi_{TE}(\lambda) - \phi(\lambda)]/\partial\lambda = G(\lambda) \tag{30}$$

Therefore, in this case, equation (17) can be replaced with the following equation, by adding a term that represents the phase of the optical coupler that is added to equation (17).

[Expression 34]

$$\sum_i (n_{aTE,i}(\lambda) \cdot L_{a,i} - n_{bTE,i}(\lambda) \cdot L_{b,i}) = \tag{31}$$
$$\frac{1}{2}\left(m - \frac{1}{2} - \gamma\right) \cdot \lambda - \frac{(1 + 2 \cdot m' - 2 \cdot \gamma) \cdot \lambda_C}{4} + \phi(\lambda) \cdot \lambda$$

The Y-branch splitter that is symmetrical along the center axis of the waveguides has been employed for this example; however, a Y-branch splitter that is asymmetrical along the center axis may be employed. Further, the WINC has been employed as an optical coupler, but another type of optical coupler may be employed. In this case, a condition for expansion of a bandwidth is calculated in accordance with a Y-branch splitter and an optical coupler that are being employed.

<Case of an Optical Splitter: a Y-Branch Splitter and an Optical Coupler: a Symmetrical Coupler (a Multimode Interference (MMI) Coupler, etc.)>

Figure 11:
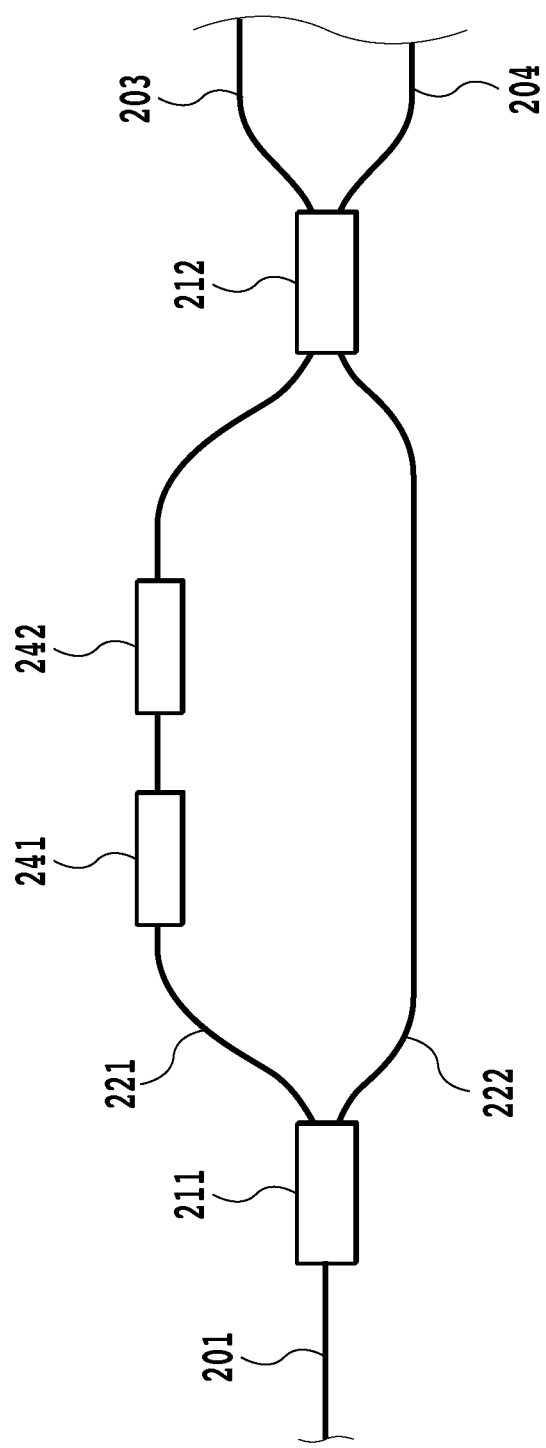
FIG. 11 is a diagram illustrating the circuit structure of the wideband interferometer type polarization beam combiner and splitter according to the embodiment of the present invention.

FIG. 11 is a diagram illustrating an example circuit arrangement for the wideband interferometer type polarization beam combiner and splitter of the present invention. This circuit includes input/output ports 201, 203 and 204, an optical splitter 211, an optical coupler 212 and an optical path length difference imparting unit, which is formed of two optical waveguides 221 and 222 arranged between the optical splitter 211 and the optical coupler 212. The optical splitter 211 is a 1-input/2-output Y-branch splitter that is symmetrical along the center axis of the waveguides, the optical coupler 212 is a 2-input/2-output optical coupler that is symmetrical along the center axis, and the optical path length difference imparting unit includes means 241, for generating differential birefringence for the optical waveguides 221 and 222, and means 242 for generating a difference in refractive index dispersion. TE light is regarded as a polarization state 1 and TM light is regarded as a polarization state 2, and the means 241 for generating differential birefringence permits the optical path length difference imparting unit to provide, for normalized phases of TE light and TM light, a difference of $m'+(1/2)$ ($m'$ is an integer), with a wavelength $\lambda c$. Furthermore, the means 242 for generating a difference in refractive index dispersion is employed to set, for the TE light and TM light, the same rate of change for the transmittance of the polarization beam combiner and splitter, relative to wavelength. As a result, polarization combining, or polarization splitting, can be performed for either the polarization state 1 or 2, with the wavelength dependency suppressed.

It is assumed that the splitting ratio/coupling ratio of the symmetrical optical coupler is $\gamma(\lambda)$ and a loss thereof is $\exp(-\eta\cdot\lambda)$, that the transfer function of a through port is represented as

[Expression 35]

$$\exp(-\eta\cdot\lambda)\cdot\sqrt{1-r(\lambda)}$$

and the transfer function of a cross port is represented as

[Expression 36]

$$\exp(-\eta\cdot\lambda)\cdot\sqrt{r(\lambda)}\cdot\exp[i\cdot 2\cdot\pi\cdot\phi(\lambda)]$$

In a case wherein light is to be input at the port 201 and output at the port 203, the phase is relatively delayed by $\phi(\lambda)$ at the optical coupler, and in a case wherein light is to be input at the port 201 and output at the port 204, the phase is relatively advanced by $\phi(\lambda)$ at the optical coupler. Therefore, when light is to be input at the port 201 and output at the ports 203 and 204, the relative normalized phases of the TE polarized light and the TM polarized light are:

[Expression 37]

$$\psi_{TE,201\Rightarrow 203}(\lambda)=\phi_{TE}(\lambda)+\phi(\lambda) \quad (32)$$

[Expression 38]

$$\psi_{TE,201\Rightarrow 204}(\lambda)=\phi_{TE}(\lambda)[-\phi(\lambda)] \quad (33)$$

[Expression 39]

$$\psi_{TE,201\Rightarrow 203}(\lambda)=\phi_{TM}(\lambda)+\phi(\lambda)=\phi_{TE}(\lambda)+[H(\lambda)/\lambda]+\phi(\lambda) \quad (34)$$

[Expression 40]

$$\psi_{TE,201\Rightarrow 204}(\lambda)=\phi_{TM}(\lambda)[-\phi(\lambda)]=\phi_{TE}(\lambda)+[H(\lambda)/\lambda]+[-\phi(\lambda)] \quad (35)$$

When $\psi_{TE,201\Rightarrow 204}(\lambda)$ in equation (33) is set equal to $\psi_{TM,201\Rightarrow 203}(\lambda)$ in equation (34), $\phi(\lambda)=-[H(\lambda)/(2\cdot\lambda)]$ is obtained. $\phi(\lambda)$ is substituted into equations (33) and (34), and based on condition $\psi_{TE,201\Rightarrow 204}(\lambda)=\psi_{TE,201\Rightarrow 203}(\lambda)=[m-(1/2)]$, which is required for the circuit to be operated as a polarization beam combiner and splitter, $\phi_{TE}(\lambda)=[m-(1/2)]+[H(\lambda)/(2\cdot\lambda)]$ is obtained. Therefore, instead of equation (17), the following equation (36) can be employed.

[Expression 41]

$$\sum_i (n_{aTE,i}(\lambda)\cdot L_{a,i} - n_{bTE,i}(\lambda)\cdot L_{b,i}) = \frac{1}{2}(2\cdot m - 1 - \gamma)\cdot\lambda - \frac{(1+2\cdot m' - 2\cdot\gamma)\cdot\lambda_C}{4} \quad (36)$$

As another method, $\psi_{TE,201\Rightarrow 203}(\lambda)$ in equation (32) may be set equal to $\psi_{TM,201\Rightarrow 204}(\lambda)$ in equation (35), so that $\phi(\lambda)=[H(\lambda)/(2\cdot\lambda)]$ is obtained at this time. ($\lambda$) is substituted into equations (32) and (35), and based on condition $\psi_{TE,201\Rightarrow 203}(\lambda)=\psi_{TM,201\Rightarrow 204}(\lambda)=[m-(1/2)]$, which is required for the circuit to be operated as a polarization beam combiner and splitter, $\phi_{TE}(\lambda)=[m-(1/2)]+[H(\lambda)/(2\cdot\lambda)]$ is obtained, which is the same conditional equation as above. It is assumed that in the process for calculating the above described equation the splitting ratio/coupling ratio of the optical coupler, the loss and the phase are identical for TE polarized light and TM light; however, when these parameters differ greatly, the wavelength dependency should be taken into account when performing a calculation. Furthermore, equation (36) is established, independent of the phase provided by the optical coupler. During the calculation process performed for obtaining equation (36), equation $\phi(\lambda)=\pm[H(\lambda)/(2\cdot\lambda)]$ is obtained; however, $\phi(\lambda)$ is an arbitrary value, and may be varied depending on what optical coupler is being employed. The relative normalized phase $\phi_{TE}(\lambda)$ for the optical path length difference imparting unit is set based on equation (36), and when the phase of the optical coupler that is actually employed is substituted into equations (32), (33), (34) and (35), the properties obtained by the polarization beam combiner and splitter are calculated.

Figure 19:
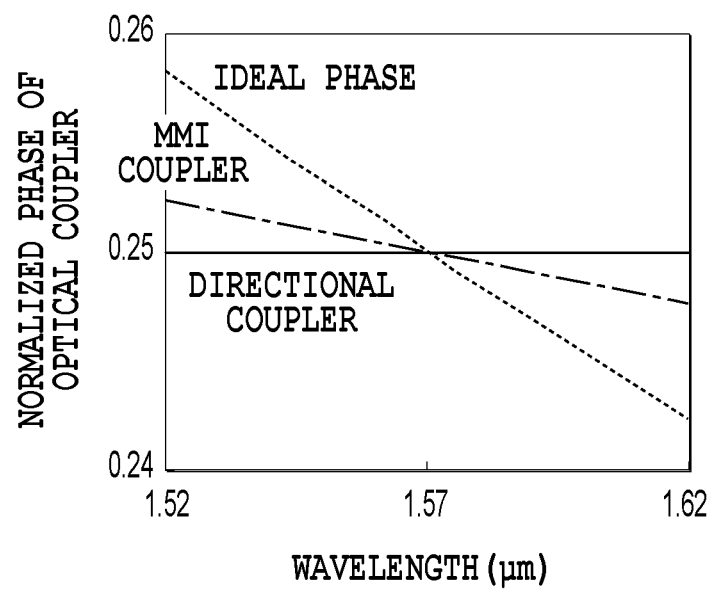
FIG. 19 is a graph illustrating wavelength dependency of a normalized phase for a directional coupler and an MMI coupler.
Figure 20A:
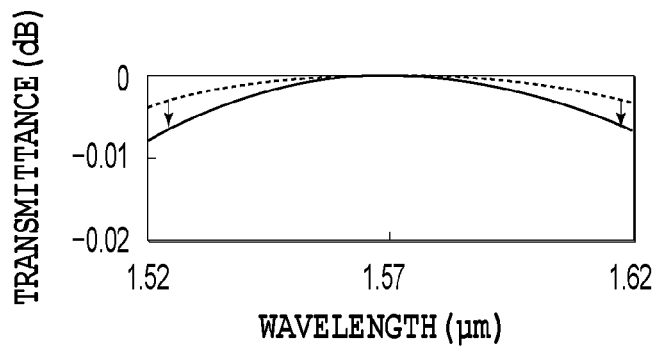
FIG. 20A is a graph showing a transmission property, obtained for the wideband interferometer type polarization beam combiner and splitter of the embodiment of the present invention.
Figure 20B:
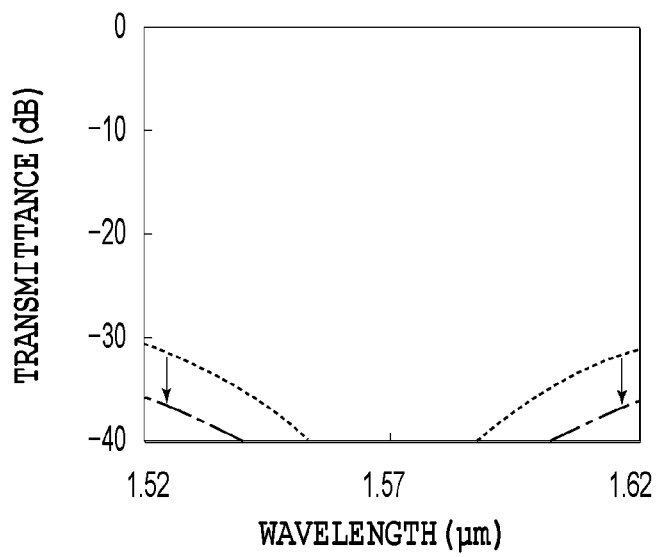
FIG. 20B is a graph showing a cutoff property, obtained for the wideband interferometer type polarization beam combiner and splitter of the embodiment of the present invention.
Figure 20C:
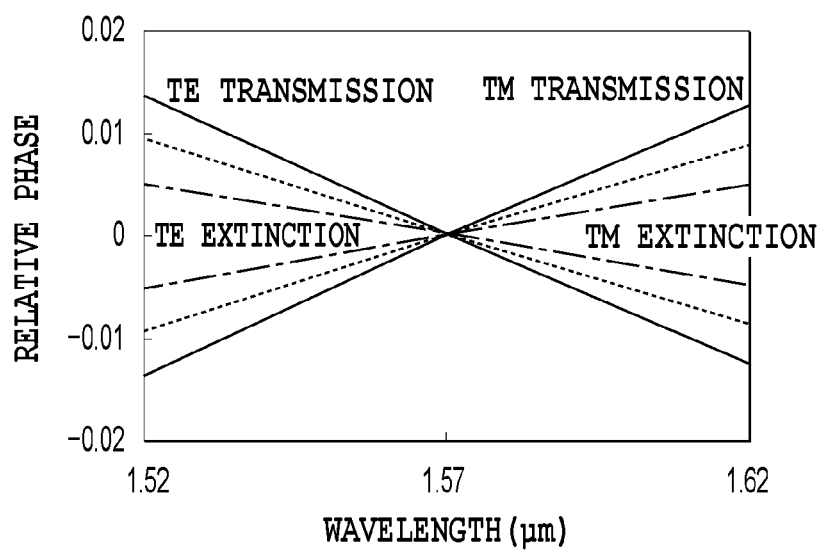
FIG. 20C is a graph showing wavelength dependency for a relative phase, obtained for the wideband interferometer type polarization beam combiner and splitter of the embodiment of the present invention.

The wavelength dependency for normalized phases of the MMI coupler and the directional coupler is shown in FIG. 19. In the case of the directional coupler, for example, the normalized phase difference is a constant value of ¼, relative to a wavelength. In the case of the MMI coupler, the normalized phase difference has a wavelength dependency. Therefore, this wavelength dependency is focused on, and the transmittance property can be improved by utilizing the wavelength dependency. A dotted line in FIG. 20C indicates a relative phase in FIG. 4C, and according to the arrangement of this embodiment, since the phase of the MMI coupler is additionally provided, the relative phase is shifted from the relative phase in FIG. 4C. When the rate of change of a relative phase with wavelength is smaller, it indicates that wavelength dependency is lower. Therefore, as shown in FIG. 20C, when the rate of change of a relative phase with wavelength is reduced under a polarization state in extinction conditions, the extinction ratio can be further improved. At this time, under the polarization state in transmission conditions, the rate of change for a relative phase with wavelength is increased; however, when this change rate is converted into transmittance, the increase in loss is very small, while the effect obtained by improving the extinction ratio is greater. A transmitting spectrum of transmission is shown in FIG. 20A, and a transmission spectrum of extinction is shown in FIG. 20B. It is apparent that although there is a slight increase in loss, the extinction ratio is greatly improved. When the phase of the optical coupler is employed in this manner, the properties of the interferometer type polarization beam combiner and splitter can be improved.

In the above embodiment, an example wherein the present invention is applied for a single interferometer type polarized type combiner and splitter has been employed. However, another interferometer type polarization beam combiner and splitter, or a polarizer, may be connected to the above described interferometer type polarization beam combiner and splitter.

Figure 21:
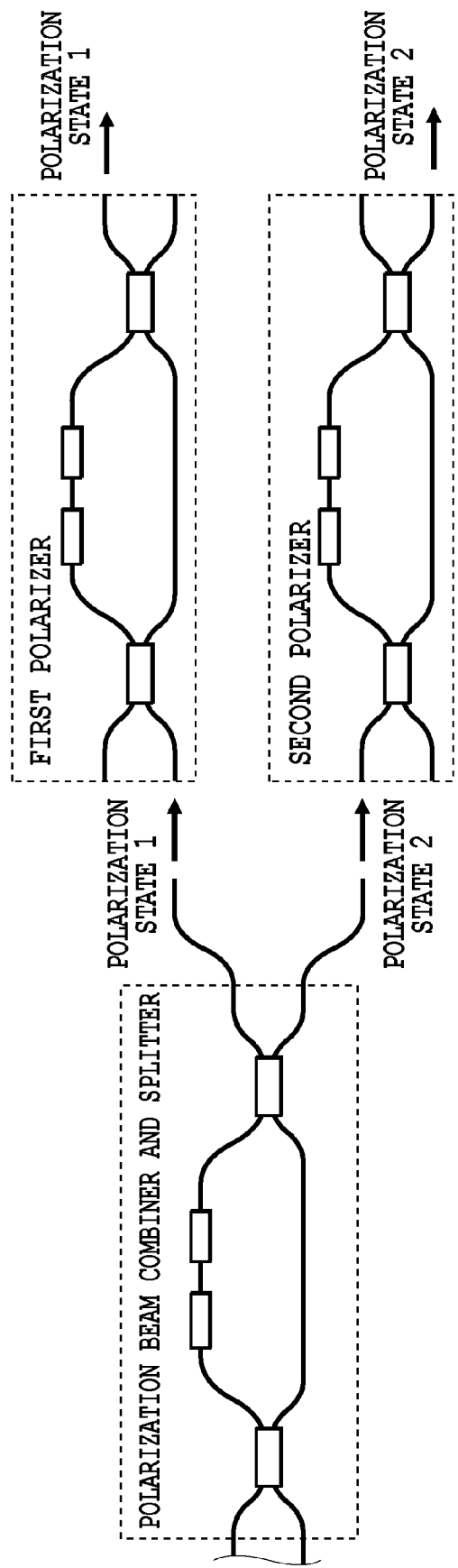
FIG. 21 is a diagram illustrating one embodiment of an interferometer type polarization beam combiner and splitter where the interferometer type polarization beam combiner and splitter of this invention is connected at multiple stages.

One embodiment for an interferometer type polarization beam combiner and splitter, where the interferometer type polarized combiner and splitter of the present invention is connected at two stages, is shown in FIG. 21. According to this circuit, a first polarization beam combiner and splitter (a polarizer) is connected to one of the output ports of the polarization beam combiner and splitter explained while referring to FIG. 2, and a second polarization beam combiner and splitter (a polarizer) is connected to the other output port. The first polarization beam combiner and splitter and the second polarization beam combiner and splitter at the rear stage, which are connected to the polarization beam combiner and splitter at the front stage, include the same components as the polarization beam combiner and splitter arranged at the front stage. However, since the two polarized light combining/splitting devices arranged at the rear stage are employed as polarizers, each of which permit the passage of a polarization state, these combining/splitting devices are designated as the first polarizer and the second polarizer in the drawing.

It is assumed that the polarization beam combiner and splitter at the front stage is set to separate input light into a polarization state 1 and a polarization state 2, and that the first polarizer permits the passage of the polarization state 1 and that the second polarizer permits the passage of the polarization state 2. Since the polarization state 1 is output at one output port of the polarization beam combiner and splitter at the front stage, and passes through the first polarizer, the polarization extinction ratio can be further improved. Further, since the polarization state 2 is output at the other port of the polarization beam combiner and splitter at the front stage, and passes through the second polarizer, the polarization extinction ratio can also be improved. According to the above described arrangement, wherein other interferometer type polarized light combining and splitting devices, or polarizers, are connected to the output side of the interferometer type polarization beam combiner and splitter of this invention, the polarization extinction ratio of the entire circuit can be remarkably improved.

The above described arrangement is merely an example wherein interferometer type polarized light combining and splitting devices are connected at multiple stages, and arbitrary ports can be employed for connection. Furthermore, interferometer type polarized light combining and splitting devices may be connected at three or more stages, and different circuit structures may be connected together, or polarized light combining and splitting devices that are produced by using materials that differ from each other may be connected together. Further, a different type of polarization beam combiner and splitter or a polarizer may also be connected to the interferometer type polarization beam combiner and splitter of this invention. For example, the interferometer type polarization beam combiner and splitter of this invention may be connected to a quadrature hybrid circuit and be employed as the component of a quadrature hybrid for dual polarization, or may be connected to an LN modulator and be employed as a component of a polarization division multiplexed transmitter.

The same structure, or different structures, may be employed for the polarization beam combiner and splitter at the front stage and the polarization beam combiner and splitter at the rear stage. Further, the polarized light combining and splitting devices at the front and rear stages that include the same components may employed to perform different functions by changing the parameters. As a specific example, an explanation will be given for a case wherein an operation is performed when the polarization state 1 is regarded as TE light and the polarization state 2 is regarded as TM light, and the first polarization beam combiner and splitter may be employed as a polarizer for a TE transmitting type, while the second polarization beam combiner and splitter may be employed as a polarizer for a TM transmitting type.

Figure 22A:
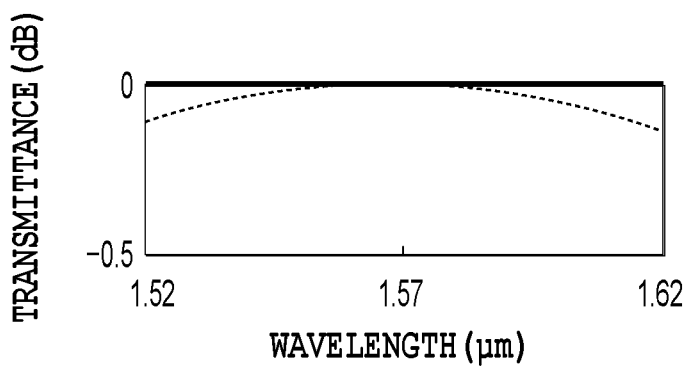
FIG. 22A is a graph showing a transmission property, obtained for a wideband interferometer type TE-passing polarizer in the embodiment of the present invention.
Figure 22B:
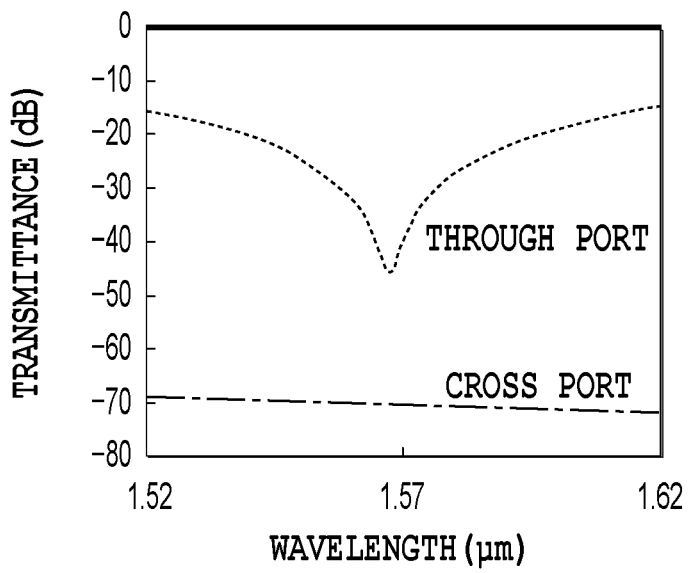
FIG. 22B is a graph showing a blocking property, obtained for the wideband interferometer type TE-passing polarizer in the embodiment of the present invention.
Figure 22C:
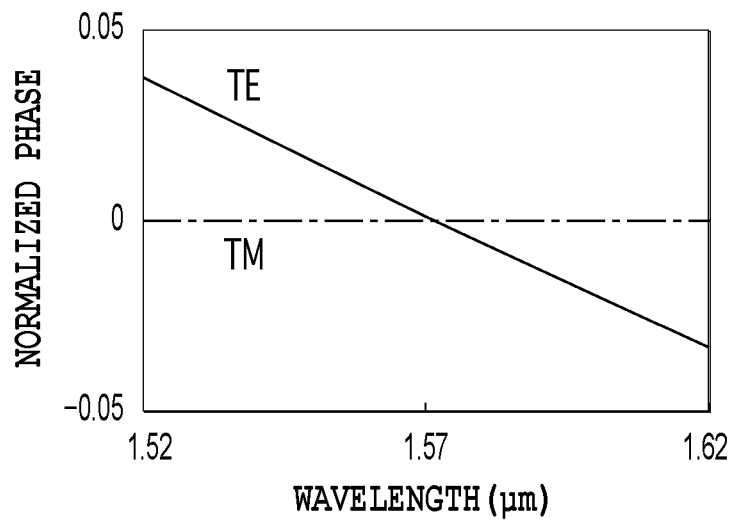
FIG. 22C is a graph showing wavelength dependency of a normalized phase, obtained for the wideband interferometer type TE-passing polarizer of the embodiment of the present invention.

The first polarizer may be set, as explained while referring to FIG. 4, so that the rate of change, with wavelength, of a normalized phase difference between TE light and TM light becomes the smallest, on average. However, since the first polarizer is to be operated as a TE-passing polarizer, as shown in FIG. 22C, a constant value is set as the rate of change for a normalized phase of TM light, with wavelength. As a result, the extinction of TM light can be performed across a wide range of wavelengths. Therefore, while, as shown in FIG. 22A, the transmittance of TE light is reduced and a excessive loss for the circuit is increased, as shown in FIG. 22B, the extinction ratio of the TM light can be greatly improved. Of course, a constant value may be set for the rate of change of the normalized phase of TE light, with wavelength, so that transmission of TE light can be permitted across a wide range of wavelengths, and a loss can be suppressed.

Figure 23A:
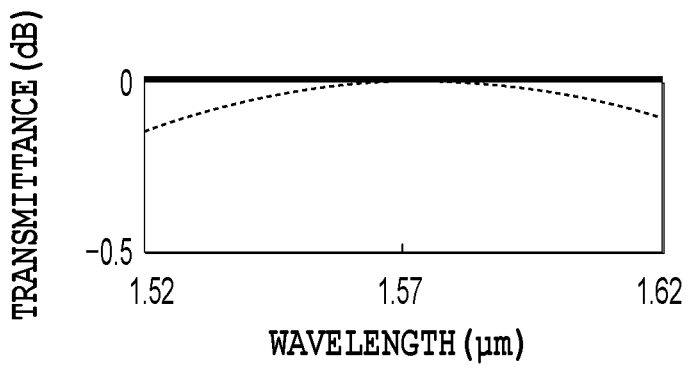
FIG. 23A is a graph showing a transmission property, obtained for a wideband interferometer type TM-passing polarizer in the embodiment of the present invention.
Figure 23B:
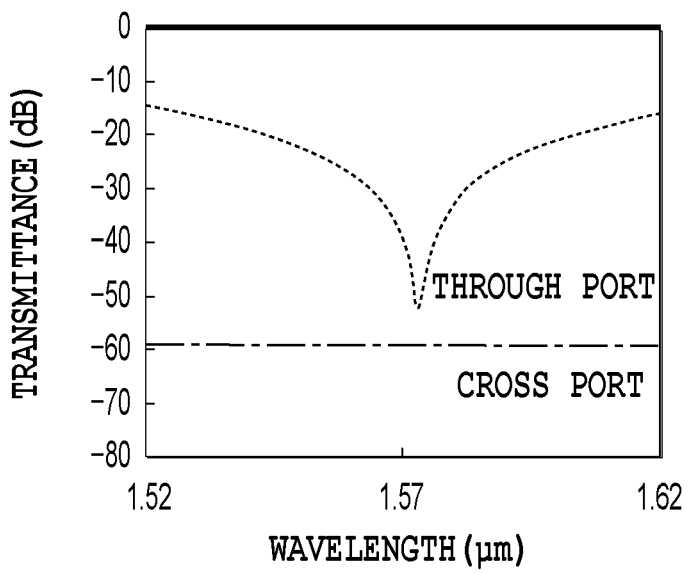
FIG. 23B is a graph showing a blocking property, obtained for the wideband interferometer type TM-passing polarizer in the embodiment of the present invention.
Figure 23C:
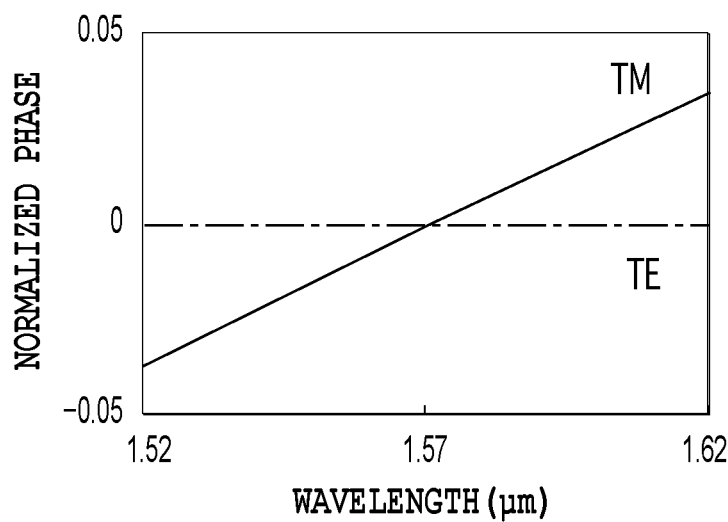
FIG. 23C is a graph showing wavelength dependency for a normalized phase, obtained for the wideband interferometer type TM-passing polarizer of the embodiment of the present invention.

Since the second polarizer is to be operated as a TM-passing polarizer, as shown in FIG. 23C, a constant value is set for the rate of change of the normalized phase of TE light, with wavelength, so that extinction of TE light can be performed across a wide wavelength range. As a result, while as shown in FIG. 23A, the transmittance of TM light is reduced and an excessive loss for a circuit is increased, as shown in FIG. 23B, the extinction ratio for the TE light can be greatly improved. Of course, a constant value may be set for the rate of change for the normalized phase of TM light, with wavelength, so that the transmission of TM light can be permitted across a large range of wavelengths, and a loss of the circuit can be suppressed.

As described above, according to this embodiment, in the polarization beam combiner and splitter wherein polarized light combining and splitting devices are connected at multiple stages, light in the polarization state 1 is output at one of the output ports of the polarization beam combiner and splitter at the front stage. The first polarization beam combiner and splitter, connected to this output port, serve together as a polarizer for a polarization state 1 passing type. The normalized phase for the first polarization beam combiner and splitter, either in the polarization state 1 or the polarization state 2, is constant, with a wavelength. The light in the polarization state 2 is output at the other output port for the polarization beam combiner and splitter at the front stage. The second polarization beam combiner and splitter, connected to this output port, serve together as a polarizer for a polarization state 2 passing type. The normalized phase for the second polarization beam combiner and splitter, either in the polarization state 1 or the polarization state 2, is constant, with a wavelength. When this arrangement is employed, an excessive loss can be reduced, or the extinction ratio can be further improved.

The polarization beam combiner and splitter located at the rear stage may be employed as a single polarizer. This polarization beam combiner and splitter includes an optical splitter, an optical coupler, an optical path length difference imparting unit, which is formed of a plurality of optical waveguides arranged between the optical splitter and the optical coupler, one or more input/output ports connected to the optical splitter, and one or more input/output ports connected to the optical coupler. With such a polarization beam combiner and splitter, means for generating differential birefringence between a plurality of optical waveguides of the optical path length difference imparting unit may be provided, either for an interferometer polarizer of a polarization state 1 passing type, wherein when light is input at the input/output port of the optical coupler, light in the polarization state 1 is permitted to pass through the input/output port of the optical splitter, and light in the polarization state 2 is blocked, or for an interferometer polarizer of a polarization state 2 passing type, wherein when light is input at the input/output port of the optical coupler, light in the polarization state 2 is allowed to pass through the input/output port of the optical splitter, and light in the polarization state 1 is blocked. With this arrangement, a difference in refractive index dispersion can also be generated between the optical waveguides of the optical path length difference imparting unit.

Further, a normalized phase difference $\phi_2(\lambda)-\phi_1(\lambda)$, provided by the optical path length difference imparting unit for the polarization state 1 and the polarization state 2, is set as $m'+(\frac{1}{2})$ with a wavelength $\lambda c$ ($m'$ is an integer), and a difference in refractive index dispersion, provided by the means for generating a difference in refractive index dispersion, is employed to adjust the normalized phase of either the polarization state 1 or the normalized state 2 so constant, with a wavelength. As a result, a wideband interferometer type polarizer can be provided.

Further, when the optical splitter and the optical coupler, which together serve as the interferometer type polarizer, include at least one input/output port, these devices can be employed as polarizers. In a case wherein a 2-input/2-output optical splitter, having a splitting ratio of 50% with the center wavelength, and a 2-input/2-output optical coupler, having a coupling ratio of 50% with the center wavelength, are employed, and wherein two input ports of the optical splitter are employed as those of the interferometer type polarizer, and the two output ports of the optical coupler are employed as those of the interferometer type polarizer, light can be input at one of the input ports of the interferometer type polarizer, and be output at the output port that corresponds to a cross port. With this arrangement, even when the splitting ratio of the optical splitter and the coupling ratio of the optical coupler might be shifted from 50% due to manufacturing variance, a high extinction ratio can be maintained. Therefore, referring to FIG. 21, the cross port is employed for the polarization beam combiner and splitter arranged at the rear stage that serves as a polarizer; however, of course, a through port may also be employed.

An arbitrary device, such as a Y-branch splitter, an MMI coupler, a WINC or a directional coupler, may be employed as an optical splitter and an optical coupler that serve as a polarization beam combiner and splitter and a polarizer. Further, when such a device is employed as a polarizer, one input port and one output port are required at most, and when the optical splitter and the optical coupler are provided by using directional couplers having a wavelength-dependent coupling ratio, a high extinction ratio can still be obtained at the cross port. Therefore, the circuit length can be reduced, compared with when a WINC is employed.

A polarization rotator may be inserted into the polarization beam combiner and splitter of this invention. The interferometer type polarized light combining and splitting devices connected at two stages, as explained while referring to FIG. 21, are shown in FIG. 24A.

In FIG. 24B, polarization state 1 (TE) passing polarizers are connected to the two output ports of the polarization beam combiner and splitter at the front stage, and a polarization rotator 401 is inserted between one of the output ports of the polarization beam combiner and splitter and the polarization state 1 (TE) passing polarizer. With this arrangement, light in the polarization state 1 (TE mode) can be output through the output ports of the two polarizers, and as a result, only one device type is required for the polarizers at the rear stage.

In FIG. 24C, polarization state 1 (TE) passing polarizers are connected to two output ports of the polarization beam combiner and splitter at the front stage, and a polarization rotator is inserted between one of the output ports of the polarization beam combiner and splitter and the polarization state 1 (TE) passing polarizer. A polarization rotator 401 is also inserted at the rear of the polarization state 1 (TE) passing polarizer arranged at the rear stage. With this arrangement, the same type of polarizer is employed for the rear stage, and polarized light output through the two output ports will be identical to polarized light output by the polarization beam combiner and splitter located at the front stage.

In FIG. 24D, polarization state 1 (TE) passing polarizers are connected to the two output ports of the polarization beam combiner and splitter at the front stage, and a polarization rotator is inserted between one of the output ports of the polarization beam combiner and splitter and the polarization state 1 (TE) passing polarizer. A polarization rotator is also inserted at the rear of the polarization state 1 (TE) passing polarizer at the rear stage, which is connected to the other output port of the polarization beam combiner and splitter at the front stage. With this arrangement, the polarizers at the rear stage can be the same type, and beams output through the two output ports respectively pass the polarization rotators one time, so that circuit losses at the two outputs are equal.

A case wherein the polarization state 1 (TE) passing polarizers are employed for both polarizers at the rear stage has been employed for the description while referring to FIGS. 24B to 24D. However, an arrangement wherein polarization state 2 (TM) passing polarizers are employed for both polarizers at the rear stage is also available.

Figure 12A:
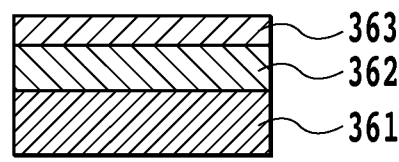
FIG. 12A is a diagram illustrating the manufacturing process for the wideband interferometer type polarization beam combiner and splitter formed on a planar substrate.
Figure 12B:
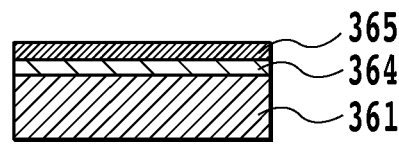
FIG. 12B is a diagram illustrating the manufacturing process for the wideband interferometer type polarization beam combiner and splitter formed on the planar substrate.
Figure 12C:
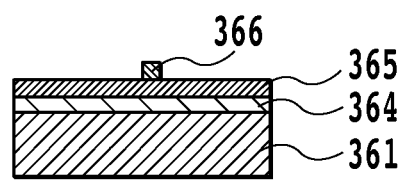
FIG. 12C is a diagram illustrating the manufacturing process for the wideband interferometer type polarization beam combiner and splitter formed on the planar substrate.
Figure 12D:
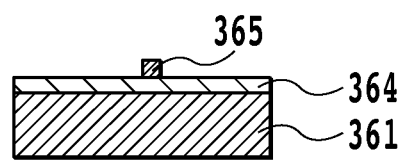
FIG. 12D is a diagram illustrating the manufacturing process for the wideband interferometer type polarization beam combiner and splitter formed on the planar substrate.
Figure 12E:
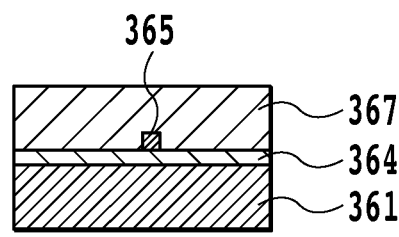
FIG. 12E is a diagram illustrating the manufacturing process for the wideband interferometer type polarization beam combiner and splitter formed on the planar substrate.

A manufacturing example for the polarization beam combiner and splitter according to this invention will now be described. Assume that a silica-based planar lightwave circuit formed on a silicon substrate is to be produced as a polarization beam combiner and splitter. The manufacturing processing is shown in FIG. 12. Underclad glass soot 362, which contains $SiO_2$ as a main element, and core glass soot 363, which contains $SiO_2$ to which $GeO_2$ has been added, are deposited on a planar substrate 361 by flame hydrolysis deposition (FIG. 12A). Thereafter, the deposited glass soot is heated at a high temperature of 1000° C. or more to be transformed and rendered transparent. It should be noted that glass has been deposited, so that the thicknesses of an underclad glass layer 364 and a core glass 365 are as had been designed (FIG. 12B). Following this, an etching mask 366 is formed on the core glass 365 by photolithography (FIG. 12C), and patterning is performed for the core glass 365 by reactive ion etching (FIG. 12D). The etching mask 366 is removed, and then, overclad glass 367 is deposited by again performing flame hydrolysis deposition. For the overclad glass 367, a glass transfer temperature is reduced by adding a dopant, such as $B_2O_3$ or $P_2O_5$, to the overclad glass 367, so that the overclad glass 367 can enter small gaps in the core glass 365 (FIG. 12E). After this processing has been completed, a thin-film heater or a heat insulating groove may be formed, as needed.

The above described example of a planar lightwave circuit is a silica-based glass waveguide formed on a silicon substrate. However, a waveguide material that may be used is a multi-component oxide glass, a polymer, such as polyimide, a semiconductor such as InP, or a dielectric crystal such as $LiNbO_3$. Further, the manufacturing method may, for example, be spin coating, the sol-gel process, the sputtering process, the CVD process, the ionic diffusion process, or direct patterning by focused ion-beam irradiation. Furthermore, the substrate material is not limited to silicon, but may also be another material, such as quartz.

Several examples for the present invention will now be described below.

Example 1

A wideband interferometer type polarization beam combiner and splitter according to example 1 is illustrated in FIG. 13A. In this example, a WINC is employed as an optical splitter and an optical coupler, and a WINC 314, serving as an optical splitter, and a WINC 315, serving as an optical coupler, are arranged symmetrically at the center of a circuit. Grooves 331 are formed in the vicinity of both sides of an optical waveguide 222 of an optical path length difference imparting unit, and differential birefringence is generated by releasing stress on the waveguide through the grooves. These grooves are called stress release grooves. Further, an element that changes the width of an optical waveguide is provided for the other optical waveguide 221 of the optical path length difference imparting unit, and is employed to generate a difference in refractive index dispersion. This element is called a width-varying waveguide 341. The means for generating differential birefringence and the means for generating a difference in refractive index dispersion are set to satisfy equations (16) and (17). In this example, since the dispersion of the refractive index differs as the width of the optical waveguide is changed, this fact is employed and an optical waveguide having a different width (a width-varying waveguide) is provided for one of the waveguides of the optical path length difference imparting unit, and is employed as means for generating a difference in refractive index dispersion. This width-varying waveguide is characterized by being easily machined. Of course, the waveguide thickness may be changed between the optical waveguides included in the optical path length difference imparting unit. In addition, the refractive index dispersion may also be changed by altering a cross-sectional shape, or by irradiation with light or the thermo-optic effect, and when the value V of the optical waveguide is changed, this can be employed as means for generating a difference in refractive index dispersion.

Example numerical values will be specifically given below. The width of an optical waveguide is set as 4.5 µm. For the optical waveguides, except for the one for which either the means (the width-varying waveguide 341) for generating a difference in refractive index dispersion in the optical path length difference imparting unit, or the means (the stress release grooves 331) for generating differential birefringence is provided, an optical path length difference ΔL between the optical waveguide 221 and the optical waveguide 222 is set as −0.5 µm. Further, as shown in FIG. 13B, a distance (a ridge width) between the stress release grooves 331 is set as 0.05 mm, while the depth for the stress release grooves 331 is 0.05 mm and the width thereof is 0.05 mm. The length Lg of the stress release grooves 331 is set as 1.2 mm. Furthermore, as shown in FIG. 13C, the width-varying waveguide 341 is formed of a tapered waveguide 342, a linear waveguide 343 and a tapered waveguide 344. The tapered waveguide 342 is a waveguide, which is 0.2 mm long, that changes the waveguide width from 4.5 µm to 5.5 µm; the linear waveguide 343 is a waveguide having a width of 5.5 µm and a length of 0.1 mm; and the tapered waveguide 344 is a waveguide, which is 0.2 mm long, that changes the waveguide width from 5.5 µm to 4.5 µm. Since the width of the width-varying portion employed for this example is only 5.5 µm, differential birefringence does not occur relative to the peripheral optical waveguides, which are 4.5 µm wide, and only a difference in refractive index dispersion occurs. Also, since a difference in width from the peripheral optical waveguides is only 1 µm, this device is characterized by being stably produced, without being affected by a deviation in the widths of the optical waveguides.

Example 2

Figure 14:
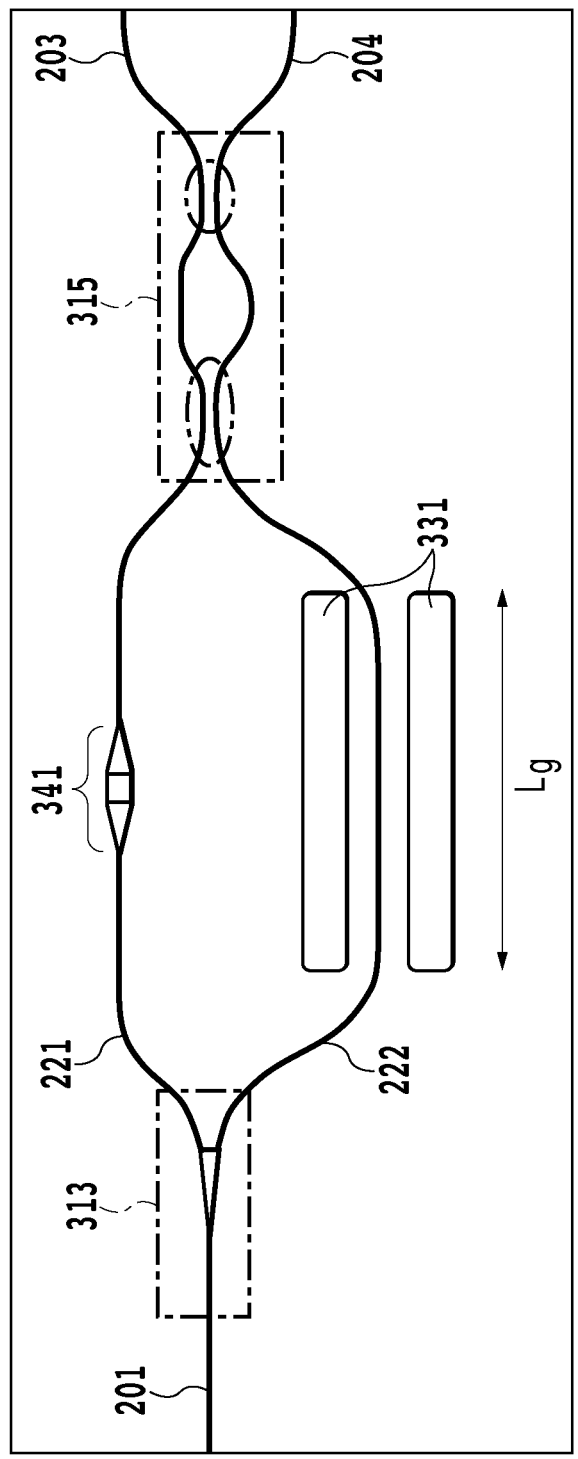
FIG. 14 is a diagram illustrating a wideband interferometer type polarization beam combiner and splitter according to example 2.

A wideband interferometer type polarization beam combiner and splitter according to example 2 is shown in FIG. 14. A difference in this example from example 1 is that a Y-branch splitter 313 is employed instead of a WINO, serving as an optical splitter, and the other arrangement is the same as that in example 1. Means for generating differential birefringence and means for generating a difference in refractive index dispersion are provided in order to satisfy equations (16) and (31).

Example numerical values will be specifically given below. The width of an optical waveguide is set as 4.5 µm. For the optical waveguides, except for the one for which either the means (a width-varying waveguide 341), for generating a difference in refractive index dispersion in an optical path length difference imparting unit, or the means (stress release grooves 331), for generating differential birefringence, is provided, an optical path length difference ΔL between an optical waveguide 221 and an optical waveguide 222 is set as −0.4 µm. Further, a distance (a ridge width) between the stress release grooves 331 is set as 0.04 mm, while the depth for the stress release grooves 331 is 0.03 mm, the width thereof is 0.04 mm, and the length Lg is set as 1 mm. Furthermore, the width-varying waveguide 341 is a waveguide formed of: a tapered waveguide, which is 0.1 mm long, that changes the waveguide width from 4.5 µm to 5.5 µm; a linear waveguide having a width of 5.5 µm and a length of 0.3 mm; and a tapered waveguide, which is 0.1 mm long, that changes the waveguide width from 5.5 µm to 4.5 µm.

Example 3

Figure 15A:
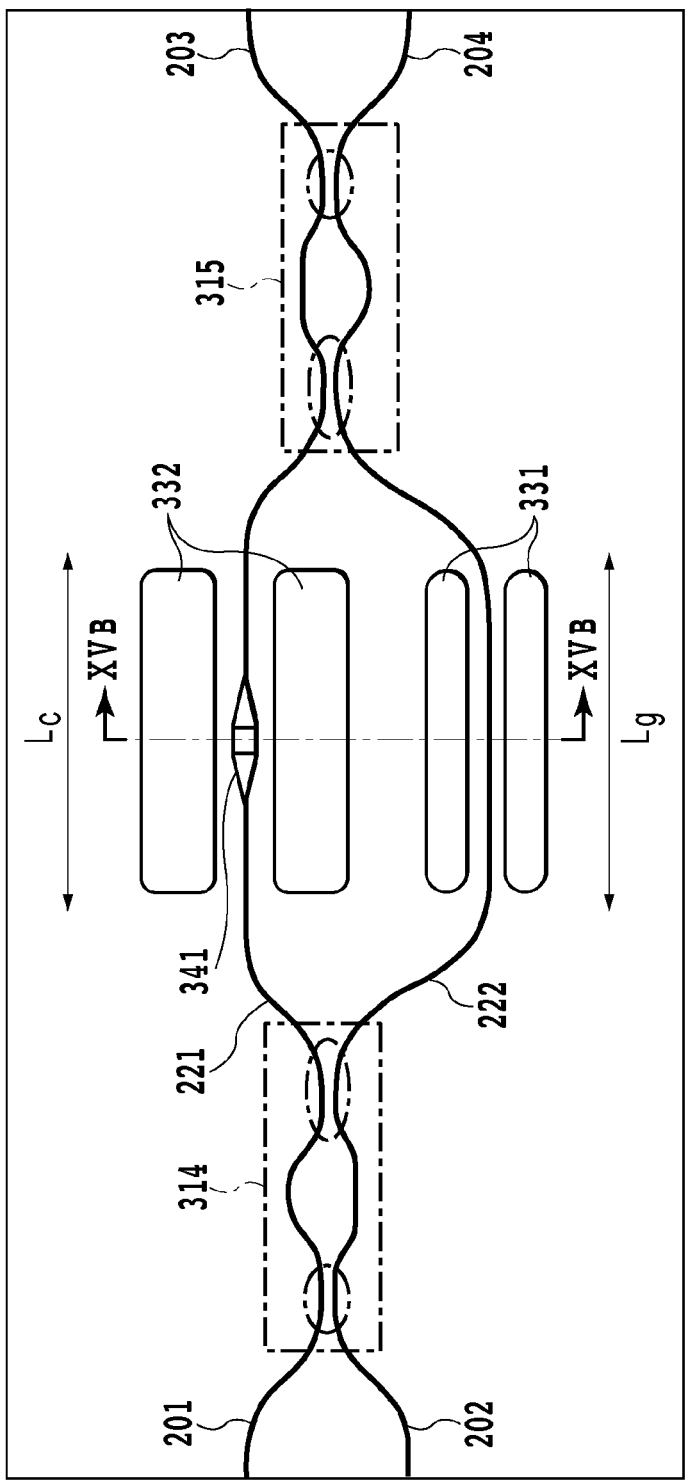
FIG. 15A is a diagram illustrating a wideband interferometer type polarization beam combiner and splitter according to example 3.

A wideband interferometer type polarization beam combiner and splitter according to example 3 is shown in FIG. 15A. A difference in this example from example 1 is that a plurality of means for generating differential birefringence are provided, and are located along different optical waveguides of an optical path length difference imparting unit, and the other arrangement is the same as that for example 1. In this example, as a second means for generating differential birefringence, extra optical waveguides are formed in the vicinity of both sides of an optical waveguide 221 of the optical path length difference imparting unit. This waveguide is called a birefringence adjustment waveguide 332. As shown in FIG. 15A, the birefringence adjustment waveguides 332 and a width-varying waveguide 341 may partially overlap each other. The means for generating differential birefringence and the means for generating a difference in refractive index dispersion are set to satisfy equations (16) and (17).

Figure 15B:
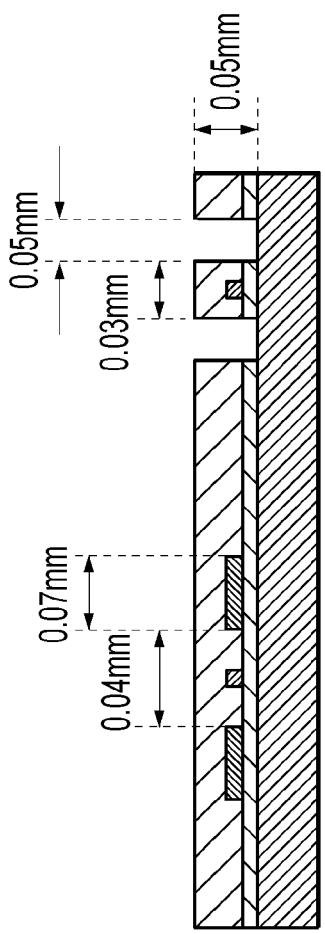
FIG. 15B is a cross-sectional view of the wideband interferometer type polarization beam combiner and splitter according to example 3.

Example numerical values will be specifically given below. The width of an optical waveguide is set as 4.5 μm. For the optical waveguides, except for the one for which either the means (the width-varying waveguide 341), for generating a difference in refractive index dispersion in the optical path length difference imparting unit, or the means (the stress release grooves 331 or the birefringence adjustment waveguides 332), for generating differential birefringence, is provided, an optical path length difference ΔL between an optical waveguide 221 and an optical waveguide 222 is set as −0.5 μm. Further, as shown in FIG. 15B, a distance (a ridge width) between the stress release grooves 331 is set as 0.03 mm, while the depth for the stress release grooves 331 is 0.05 mm and the width thereof is 0.05 mm. The length Lg of the stress release grooves 331 is set as 0.6 mm. Furthermore, the width-varying waveguide 341 is a waveguide formed of: a tapered waveguide, which is 0.3 mm long, that changes the waveguide width from 4.5 μm to 6.0 μm; a linear waveguide having a width of 6.0 μm and a length of 0.05 mm; and a tapered waveguide, which is 0.3 mm long, that changes the waveguide width from 6.0 μm to 4.5 μm. Also as shown in FIG. 15B, a distance between the birefringence adjustment waveguides 332 is set as 0.04 mm, and the width thereof is 0.07 mm. The length Lc of the birefringence adjustment waveguides is set as 0.6 mm. In this example, the birefringence adjustment waveguides and the stress release grooves are provided along different waveguides, because, for the birefringence adjustment waveguides, and the stress release groove, differential birefringence occurs for which the sign for each is the reverse of the sign for the other, and since these waveguides, and the grooves, are arranged along the waveguides on opposite sides, each other, the differential birefringence can be increased in the same direction. Of course, the birefringence adjustment waveguides, and the stress release grooves, may be provided along the same waveguide. Further, the birefringence adjustment waveguides may be employed separately, as means for generating differential birefringence, and may be employed instead of the stress release grooves employed in example 1 or 2.

Example 4

Figure 16A:
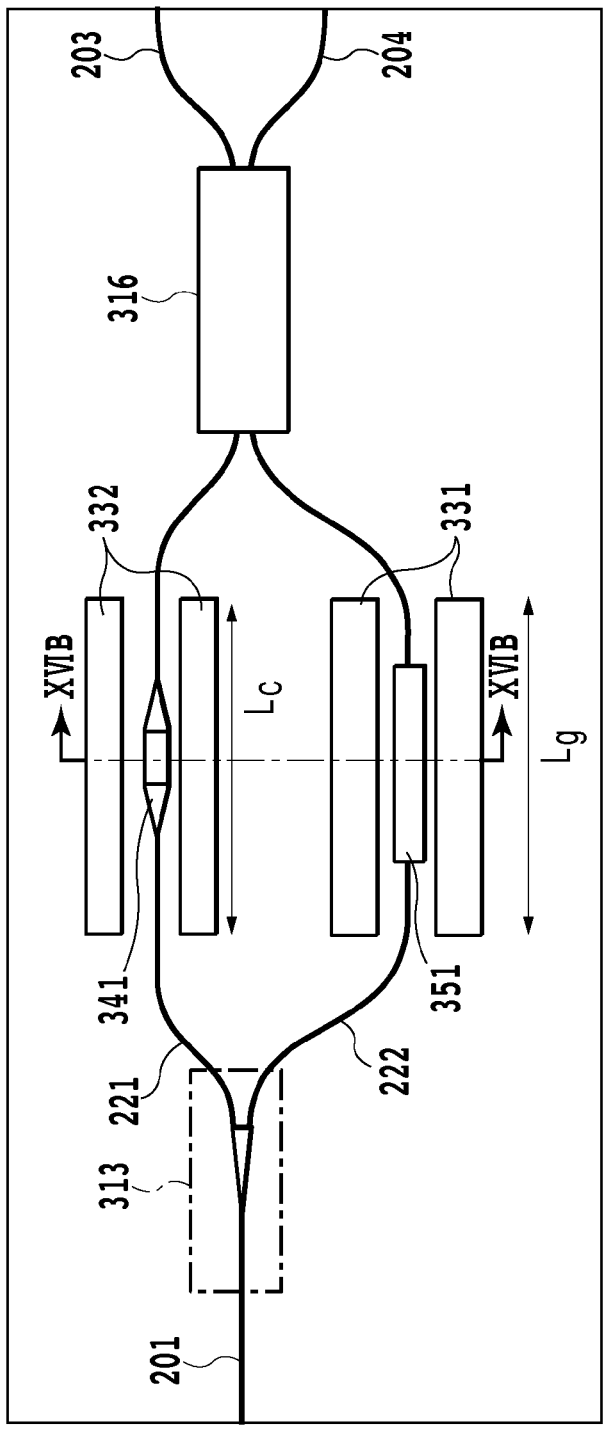
FIG. 16A is a diagram illustrating a wideband interferometer type polarization beam combiner and splitter according to example 4.

A wideband interferometer type polarization beam combiner and splitter according to example 4 is shown in FIG. 16A. In this example, a Y-branch splitter 313 is employed as an optical splitter, and an MMI coupler 316 is employed as an optical coupler. Further, means for generating differential birefringence and means for generating a difference in refractive index dispersion are similar to those for example 3, but a difference from those in example 3 is that a thermo-optic phase shifter 351 for adjusting a manufacture variance is formed along an optical waveguide 222 of an optical path length difference imparting unit. According to this example, since the thermo-optic phase shifter is provided only for one optical waveguide, the differential birefringence and a refractive index difference for the optical path length difference imparting unit are changed. Therefore, while taking into account a change due to a stress application film, such as the thermo-optic phase shifter, the means for generating differential birefringence and the means for generating a difference in refractive index dispersion are set so as to satisfy equations (16) and (36).

Figure 16B:
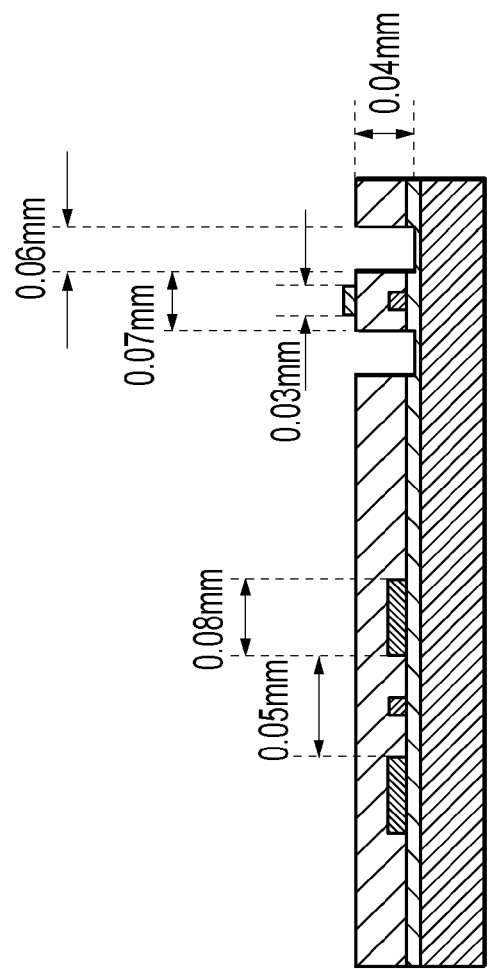
FIG. 16B is a cross-sectional view of the wideband interferometer type polarization beam combiner and splitter according to example 4.

Example numerical values will be specifically given below. The width of an optical waveguide is set as 4.5 μm. In equations (16) and (36), m is 1.5, γ is 0.06, m' is 0, and λc is 1.57 μm. For the optical waveguides, except for the one for which either the means (a width-varying waveguide 341) for generating a difference in refractive index dispersion in the optical path length difference imparting unit, or the means (stress release grooves 331 or birefringence adjustment waveguides 332) for generating differential birefringence is provided, an optical path length difference ΔL between an optical waveguide 221 and an optical waveguide 222 is set as −0.3 μm. Further, as shown in FIG. 16B, a distance (a ridge width) between the stress release grooves 331 is set as 0.07 mm, while the depth for the stress release grooves 331 is 0.04 mm and the width thereof is 0.06 mm. The length Lg of the stress release grooves 331 is set as 1.2 mm. The width of the thermo-optic phase shifter is set as 0.03 mm and the length thereof is set as 1 mm. Furthermore, the width-varying waveguide 341 is a waveguide formed of: a tapered waveguide, which is 0.4 mm long, that changes the waveguide width from 4.5 μm to 4.0 μm; a linear waveguide having a width of 4.0 μm and a length of 0.05 mm; and a tapered waveguide, which is 0.4 mm long, that changes the waveguide width from 4.0 μm to 4.5 μm. Also as shown in FIG. 16B, a distance between the birefringence adjustment waveguides 332 is set as 0.05 mm, and the width thereof is 0.08 mm. The length Lc of the birefringence adjustment waveguides is set as 0.5 mm.

Example 5

Figure 17A:
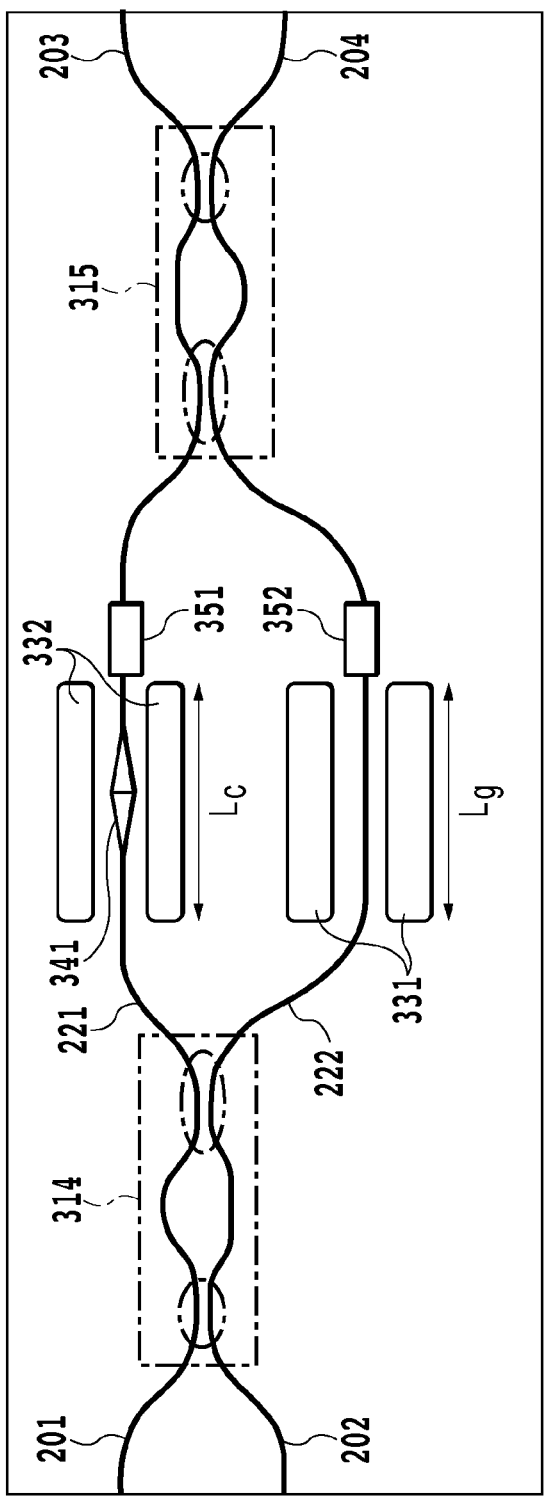
FIG. 17A is a diagram illustrating a wideband interferometer type polarization beam combiner and splitter according to example 5.
Figure 17B:
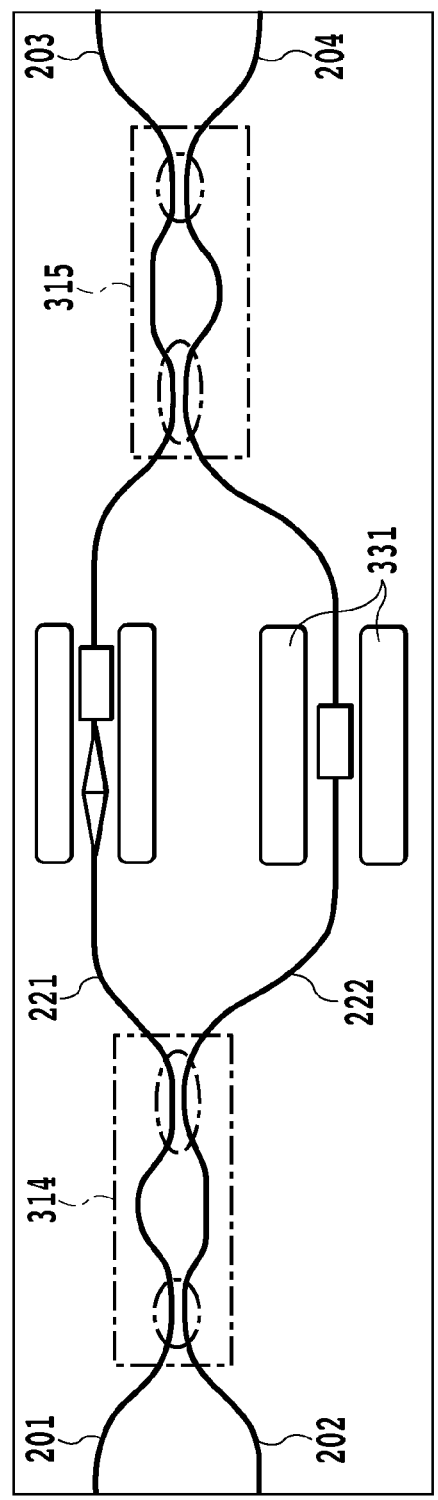
FIG. 17B is a diagram illustrating a modification of a wideband interferometer type polarization beam combiner and splitter according to example 5.

A wideband interferometer type polarization beam combiner and splitter according to example 5 is shown in FIG. 17A. A difference in this example from example 3 is that a thermo-optic phase shifter 351 is arranged along an optical waveguide 221 of an optical path length difference imparting unit, and a thermo-optic phase shifter 352 is arranged along an optical waveguide 222 of the optical path length difference imparting unit, while the remainder of arrangement is the same as that for example 3. In a case wherein the two thermo-optic phase shifters 351 and 352 have the same shape, differential birefringence and a difference in refractive index dispersion do not occur at the optical path length difference imparting unit even when these phase shifters are provided. Therefore, while the arrangement of example 3 is maintained, manufacturing errors can be adjusted for by using the thermo-optic phase shifters. Further, the means for generating differential birefringence and the means for generating a difference in refractive index dispersion are set so as to satisfy equations (16) and (17). In this example, the thermo-optic phase shifters are located separate from the means for generating differential birefringence and the means for generating a difference in refractive index dispersion. However, as shown in FIG. 17B, thermo-optic phase shifters may be arranged at a location whereat these shifters overlap the means for generating differential birefringence and the means for generating a difference in refractive index dispersion. In this case, since differential birefringence and a difference in refractive index dispersion are slightly shifted because of the thermo-optic phase shifters, correction of this shift should be designated.

Example numerical values will be specifically given below. The width of an optical waveguide is set as 4.5 μm. For the optical waveguides, except for the one for which either the means (a width-varying waveguide 341) for generating a difference in refractive index dispersion in an optical path length difference imparting unit, or the means (stress release grooves 331 or birefringence adjustment waveguides 332) for generating differential birefringence is provided, an optical path length difference ΔL between an optical waveguide 221 and an optical waveguide 222 is set as −0.5 μm. Further, a distance (a ridge width) between the stress release grooves 331 is set as 0.06 mm, while the depth for the stress release grooves 331 is 0.05 mm, the width thereof is 0.05 mm, and the length Lg is set as 1.5 mm. Furthermore, the width-varying waveguide 341 is a waveguide formed of: a tapered waveguide, which is 0.3 mm long, that changes the waveguide width from 4.5 μm to 5.5 μm; and a tapered waveguide, which is 0.3 mm long, that changes the waveguide width from 5.5 μm to 4.5 μm. Further, a distance between the birefringence adjustment waveguides 332 is set as 40 μm, and the width of the birefringence adjustment waveguide 332 is 0.1 mm and the length Lc thereof is 1.5 mm. The width of the thermo-optic phase shifters 351 and 352 is set to 0.02 mm and the length thereof is 0.5 mm. It should be noted that a tapered waveguide can be formed that has an arbitrary tapered shape, such as linear tapered shape, the width of which changes uniformly, or a tapered shape the width of which changes exponentially.

Example 6

Figure 18:
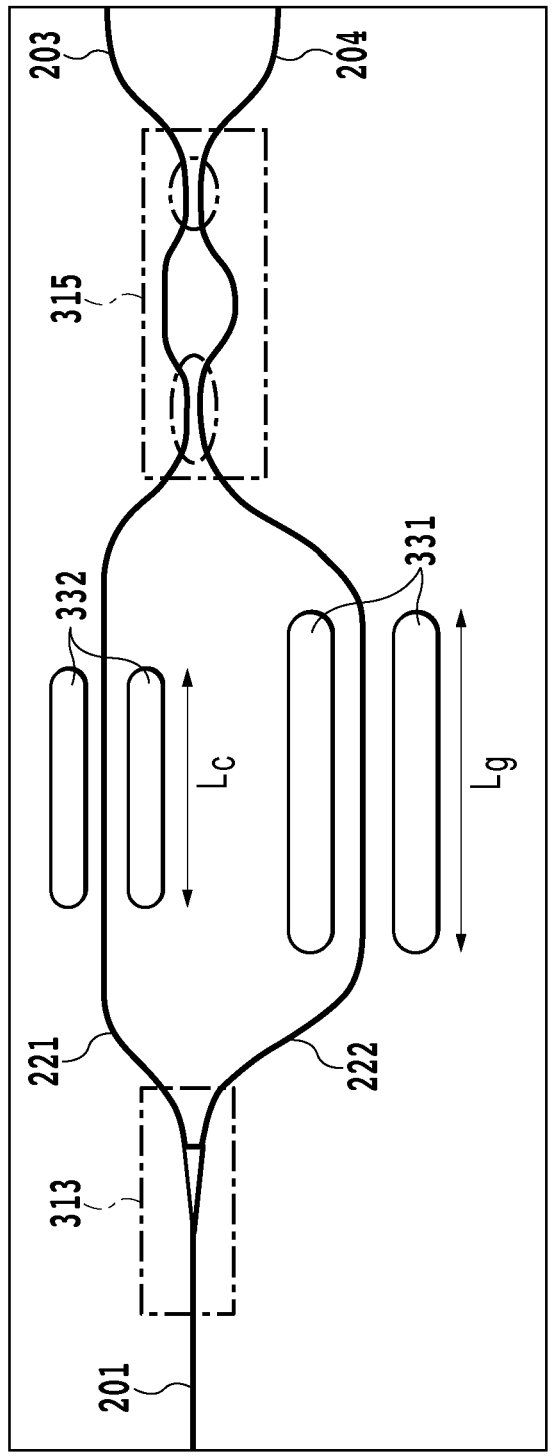
FIG. 18 is a diagram illustrating a wideband interferometer type polarization beam combiner and splitter according to example 6.

A wideband interferometer type polarization beam combiner and splitter according to example 6 is shown in FIG. 18. A difference in this example from example 2 is that instead of a width-varying waveguide, a birefringence adjustment waveguide 332 is arranged along an optical waveguide 221 of an optical path length difference imparting unit. The remainder of the arrangement is the same as that for example 2. In this example, however, stress release grooves 331 are employed as means for generating both differential birefringence and a difference in refractive index dispersion, while the birefringence adjustment waveguides 332 are also employed as means for generating both differential birefringence and a difference in refractive index dispersion. In this manner, a single means may be employed to generate both differential birefringence and a difference in refractive index dispersion. The means for generating both differential birefringence and a difference in refractive index dispersion is set so as to satisfy equations (16) and (31).

Example numerical values will be specifically given below. The width of an optical waveguide is set as 4.5 μm. For the optical waveguides, except for those for which means (the stress release grooves 331 and the birefringence adjustment waveguides 332) for generating a difference in refractive index dispersion and differential birefringence in an optical path length difference imparting unit, is provided, an optical path length difference ΔL between an optical waveguide 221 and an optical waveguide 222 is set as −0.4 μm. Further, a distance (a ridge width) between the stress release grooves 331 is set as 0.03 mm, while the depth for the stress release grooves 331 is 0.06 mm, the width thereof is 0.1 mm, and the length Lg is set as 1.0 mm. Furthermore, a distance between the birefringence adjustment waveguides 332 is set as 60 μm, and the width of the birefringence adjustment waveguide 332 is set as 0.05 mm and the length Lc thereof is 0.7 mm.

According to the above described example, the birefringence adjustment waveguides are employed as main means for generating a difference in refractive index dispersion, and the stress release grooves are employed as main means for generating differential birefringence. However, various other sets of means may be employed. When two or more types of means are employed to generate differential birefringence, the differential birefringence and a difference in refractive index dispersion need only be designated to satisfy the conditional equations for the embodiment of the present invention.

Further, when the shapes of means of the same type are different, some means can be employed both for generation of differential birefringence and for generation of a difference in refractive index dispersion. For example, as for a width-varying waveguide, when a waveguide having a width of 5.5 μm in example 5 is employed, only a difference in refractive index dispersion is generated. When a width-varying waveguide having a width of 18 μm is employed, differential birefringence is generated. Therefore, a tapered waveguide that changes a width from 4.5 μm to 5.5 μm, a linear waveguide having a width of 5.5 μm (means for generating a difference in refractive index dispersion), a tapered waveguide that changes a width from 5.5 to 18 μm, a linear waveguide having a width of 18 μm (means for generating differential birefringence) and a tapered waveguide that changes a width from 18 μm to 4.5 μm are formed for the optical path length difference imparting unit, and the length of the linear waveguide having a width of 5.5 μm, the length of the linear waveguide having a width of 18 μm and the optical path length difference ΔL are designated in order to satisfy the conditional equations provided in the embodiment of the present invention. At this time, however, the refractive index and the birefringence of the tapered waveguides must be taken into account. The numerical values given above are merely examples, and the optimal values must be designated in accordance with a material that is to be employed and its composition, and a manufacturing method that is to be employed.

In the above described examples, the stress release grooves, the birefringence adjustment waveguides, the width-varying waveguide and the stress application film are employed as means for generating differential birefringence. However, another means may be employed. Further, adjustment of differential birefringence or a difference in refractive index dispersion may be performed after an optical waveguide is formed by light irradiation, such as laser irradiation, or by the local heating using a thin-film heater.

Example 7

Figure 25:
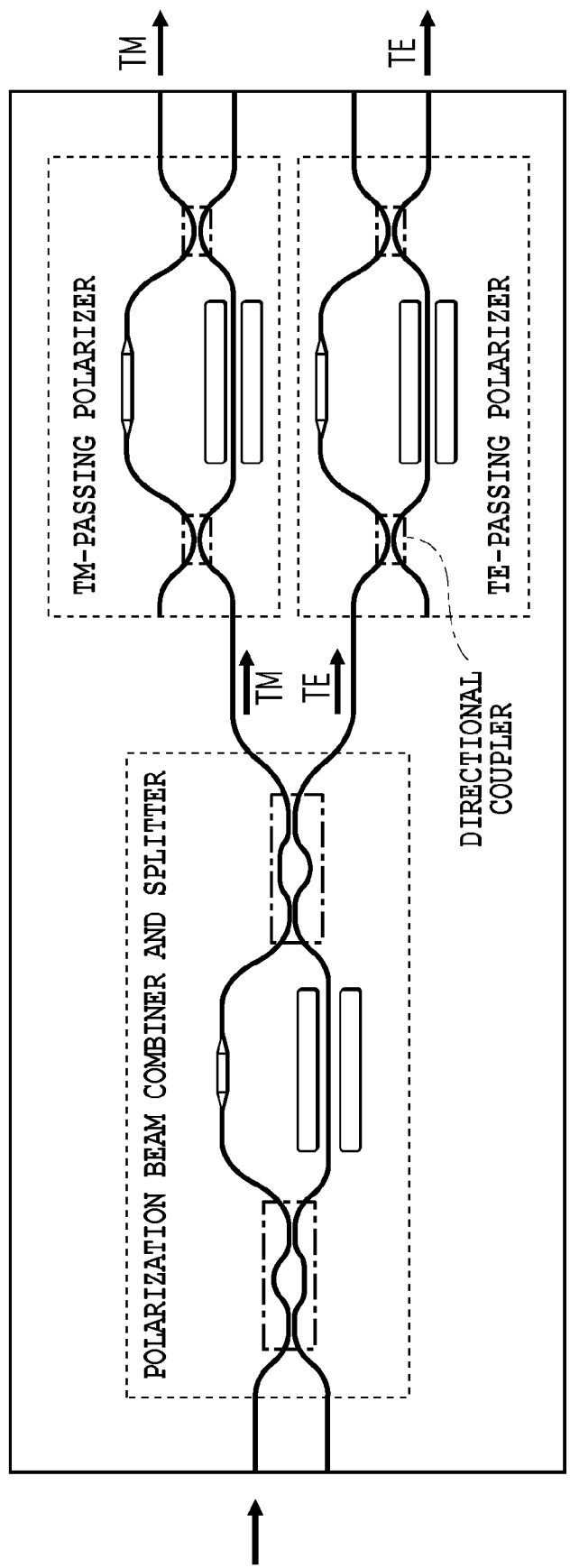
FIG. 25 is a diagram illustrating a wideband interferometer type polarization beam combiner and splitter according to example 7.
Figure 26A:
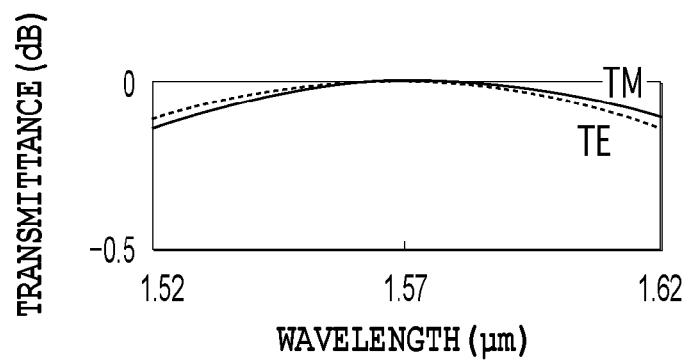
FIG. 26A is a graph showing a transmission property, obtained for the wideband interferometer type polarization beam combiner and splitter according to example 7.
Figure 26B:
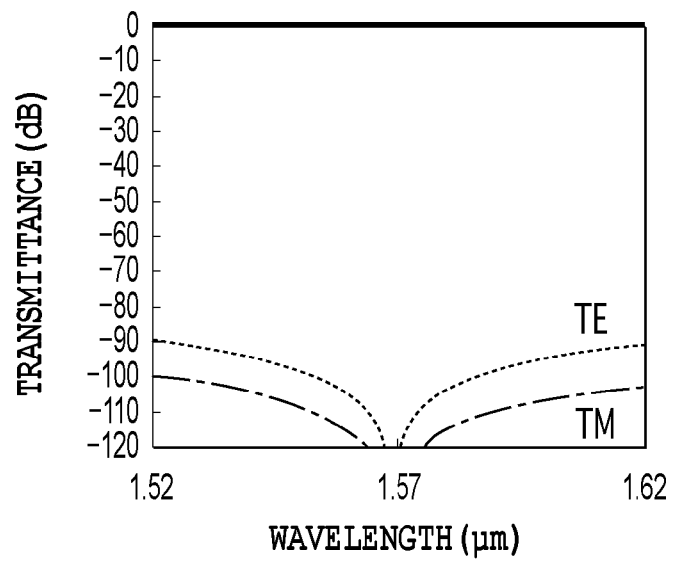
FIG. 26B is a graph showing a cutoff property, obtained for the wideband interferometer type polarization beam combiner and splitter according to example 7.

A wideband interferometer type polarization beam combiner and splitter according to example 7 is shown in FIG. 25. This circuit is provided by connecting polarized light combining/splitting devices at multiple stages. The polarization beam combiner and splitter arranged at the front stage employs a structure similar to the wideband interferometer type polarization beam combiner and splitter shown in FIG. 13A. Two polarized light combining/splitting devices arranged at the rear stage are employed as polarizers, i.e., a TM-passing polarizer and a TE-passing polarizer. The property of this circuit is shown in FIG. 26. The graph in FIG. 26A depicts a transmission property, and the graph in FIG. 26B depicts a cutoff property. It is apparent from FIG. 26 that compared with the properties in FIG. 4, the extinction property is greatly improved.

Example numerical values will be specifically given below. For the polarization beam combiner and splitter at the front stage, a width of 6.0 μm and a thickness of 6.0 μm are set for an optical waveguide, and a thickness of 20 μm is set for undercladding and overcladding. A relative index difference of the core and the cladding of the optical waveguide is set as 1.5%. For optical waveguides having a width of 6.0 μm, except for those for which the means for generating a difference in refractive index dispersion in an optical path length difference imparting unit and the means for generating differential birefringence are provided, an optical path length difference ΔL between upper and lower optical waveguides is set as −0.4 μm. Further, a distance (a ridge width) between the stress release grooves is set as 0.04 mm, while the depth for the stress release grooves is 0.04 mm, the width thereof is 0.05 mm, and the length Lg is set as 1.1 mm. Furthermore, the upper optical waveguide is a width-varying waveguide formed of: a tapered waveguide, which is 0.2 mm long, that changes the waveguide width from 6.0 μm to 8.0 μm; a linear waveguide having a width of 8.0 μm and a length L of 0.5 mm; and a tapered waveguide, which is 0.2 mm long, that changes the waveguide width from 8.0 μm to 6.0 μm.

A structure similar to that of the polarization beam combiner and splitter at the front stage is employed for the polarizers arranged at the rear stage, and instead of a WINC, a directional coupler that includes two optical waveguides located near each other is employed as an optical coupler. In the TM-passing polarizer, an optical path length difference ΔL, between upper and lower optical waveguides, is set as −0.05 μm for optical waveguides having a width of 6.0 μm, except for those where the means for generating a difference in refractive index dispersion in the optical path length difference imparting unit and the means for generating differential birefringence are provided. A distance (ridge width) between stress release grooves is set as 0.04 mm, and the depth of the stress release groove is 0.04 mm, the width thereof is 0.05 mm and the length Lg is 1.2 mm. The upper optical waveguide is a width-varying waveguide that is formed of: a tapered waveguide, which is 0.3 mm long, that changes a width from 6.0 μm to 8.5 μm; a linear waveguide having a width of 8.5 μm and a length L of 0.7 mm; and a tapered waveguide, which is 0.3 mm long, that changes a width from 8.5 μm to 6.0 μm. For the TE-passing polarizer, an optical path length difference ΔL between upper and lower optical waveguides is set as −0.6 μm for optical waveguides having a width of 6.0 μm, except for those where the means for generating a difference in refractive index dispersion in the optical path length difference imparting unit and the means for generating differential birefringence are provided. A distance (ridge width) between stress release grooves is set as 0.04 mm, and the depth of the stress release groove is 0.04 mm, the width thereof is 0.05 mm and the length Lg is 1.2 mm. The upper optical waveguide is a width-varying waveguide that is formed of: a tapered waveguide, which is 0.3 mm long, that changes a width from 6.0 μm to 9.0 μm; a linear waveguide having a width of 9.0 μm and a length L of 0.6 mm; and a tapered waveguide, which is 0.3 mm long, that changes a width from 9.0 μm to 6.0 μm. In this example, the cladding thickness is 20 μm; however, an arbitrary thickness, such as 10 μm or 40 μm, and other, different thicknesses may be employed for undercladding and overcladding. Furthermore, a relative index difference of 1.5% is employed; however, 0.75% or 2.5% may be employed, or 10% or higher may also be employed.

REFERENCE SIGNS LIST

101, 102, 103, 104: input/output port
111, 112: optical coupler
121, 122: optical waveguide
131, 132: tapered waveguide
133: linear waveguide
141, 142: tapered waveguide
201, 202, 203, 204: input/output port
211: optical splitter
212: optical coupler
221, 222: optical waveguide
241, 243: means for generating differential birefringence
242: means for generating a difference in refractive index dispersion
301, 302, 303, 304: input/output port for optical coupler
305, 306, 307: input/output port for Y-branch splitter
311, 312: directional coupler
313: Y-branch splitter
314, 315: WINC
316: MMI coupler
321, 322: optical waveguide
361: planar substrate
362: underclad glass soot
363: core glass soot
364: underclad glass
365: core glass
366: etching mask
367: overclad glass
331: stress release groove
332: birefringence adjustment waveguide
341: width-varying waveguide
342, 344: tapered waveguide
343: linear waveguide
351, 352: thermo-optic phase shifter
401: polarization rotator

The invention claimed is:

1. A wideband interferometer type polarization beam combiner and splitter, comprising:
   an optical splitting unit;
   an optical coupling unit;
   an optical path length difference imparting unit comprising a plurality of optical waveguides arranged between the optical splitting unit and the optical coupling unit;
   one or two first input/output ports connected to the optical splitting unit; and
   two second input/output ports connected to the optical coupling unit;
   wherein:
      the optical path length difference imparting unit includes, along the optical waveguides, means for generating differential birefringence and means for generating a difference in refractive index dispersion; and
   wherein:
      polarization combining is performed by inputting light in a first polarization state and light entering in a second polarization state at the two second input/output ports connected to the optical coupling unit, and by outputting the light through the one or two first input/output ports connected to the optical splitting unit, or
      polarization splitting is performed by inputting light at the one or two first input/output ports connected to the optical splitting unit, and by outputting light in the first polarization state and light in the second polarization state, respectively, through the two second input/output ports connected to the optical coupling unit, and
   wherein:
      a half-integer of a wavelength of λc is set as a normalized phase difference, for the optical path length difference imparting unit, between the first polarization state and the second polarization state; and
      wavelength fluctuation of the normalized phase difference is suppressed by a difference in refractive index dispersion that is provided by the means for generating a difference in refractive index dispersion, the wavelength fluctuation having opposite plus and minus signs for the first polarization state and the second polarization state.

2. The wideband interferometer type polarization beam combiner and splitter according to claim 1, wherein a sum total of the products of birefringence and path lengths of an optical waveguide with respect to another optical waveguide at the optical path length difference imparting unit can be approximated by $$\gamma(\lambda-\lambda c)+(m'+(1/2))\lambda c$$

where:
$\gamma$ is a parameter describing wavelength dependency of birefringence,
$\lambda$ is a wavelength, and
$\lambda c$ is a center wavelength, and
m' is an integer.

3. The wideband interferometer type polarization beam combiner and splitter according to claim 2, wherein when $\psi_1(\lambda)$ is the sum total of the normalized phases of the optical splitting unit, the optical coupling unit, and the optical path length difference imparting unit of the first polarization state, and when $\psi_2(\lambda)$ is the sum total of the normalized phases of the optical splitting unit, the optical coupling unit, and the optical path length difference imparting unit of the second polarization state, the absolute values of the change rate of $\psi_1(\lambda)$ and $\psi_2(\lambda)$ with respect to wavelength are the same and has opposite plus and minus signs.

4. The wideband interferometer type polarization beam combiner and splitter according to claim 3, wherein:
the optical splitting unit and the optical coupling unit are wavelength insensitive couplers, each of which includes two directional couplers and an optical path length difference imparting unit formed of two optical waveguides arranged between the two directional couplers; and
the wavelength insensitive couplers employed as the optical splitting unit and the optical coupling unit are arranged point symmetrical with the center of a circuit.

5. The wideband interferometer type polarization beam combiner and splitter according to claim 3, wherein the optical splitting unit is a Y-branch splitter, the optical coupling unit is an optical coupler, and a splitting ratio for the optical splitting unit and a coupling ratio for the optical coupling unit are 50%, regardless of the wavelength.

6. The wideband interferometer type polarization beam combiner and splitter according to claim 2, wherein:
the optical splitting unit and the optical coupling unit are wavelength insensitive couplers, each of which includes two directional couplers and an optical path length difference imparting unit formed of two optical waveguides arranged between the two directional couplers; and
the wavelength insensitive couplers employed as the optical splitting unit and the optical coupling unit are arranged point symmetrical with the center of a circuit.

7. The wideband interferometer type polarization beam combiner and splitter according to claim 2, wherein the optical splitting unit is a Y-branch splitter, the optical coupling unit is an optical coupler, and a splitting ratio for the optical splitting unit and a coupling ratio for the optical coupling unit are 50%, regardless of the wavelength.

8. The wideband interferometer type polarization beam combiner and splitter according to claim 2, wherein the optical splitting unit is a Y-branch splitter, the optical coupling unit is an optical coupler, the absolute values of the change rate of a normalized phase with respect to wavelength of a first polarization state and a second polarization state of the path length difference imparting unit are the same and has opposite plus and minus signs.

9. The wideband interferometer type polarization beam combiner and splitter according to claim 8, wherein the means for generating differential birefringence is provided by employing different structures for the optical waveguides of the optical path length difference imparting unit.

10. The wideband interferometer type polarization beam combiner and splitter according to claim 8, wherein the means for generating differential birefringence is provided by an adjustment of a stress to be applied to the optical waveguides of the optical path length difference imparting unit.

11. The wideband interferometer type polarization beam combiner and splitter according to claim 8, wherein the means for generating a difference in refractive index dispersion is provided by employing different structures for the optical waveguides of the optical path length difference imparting unit.

12. The wideband interferometer type polarization beam combiner and splitter according to claim 11, wherein the wideband interferometer type polarization beam combiner and splitter is formed on a planar substrate, and the optical waveguides are silica-based optical waveguides that include core and cladding layers.

13. The wideband interferometer type polarization beam combiner and splitter according to claim 1, wherein:
when $\psi_1(\pi)$ is the sum total of the normalized phases of the optical splitting unit, the optical coupling unit, and the optical path length difference imparting unit of the first polarization state, and when $\psi_2(\lambda)$ is the sum total of the normalized phases of the optical splitting unit, the optical coupling unit, and the optical path length difference imparting unit of the second polarization state, the absolute values of the change rate of $\psi_1(\lambda)$ and $\psi_2(\lambda)$ with respect to wavelength are the same and has opposite plus and minus signs;
the optical splitting unit and the optical coupling unit are wavelength insensitive couplers, each of which includes two directional couplers and an optical path length difference imparting unit formed of two optical waveguides arranged between the two directional couplers; and
the wavelength insensitive couplers employed as the optical splitting unit and the optical coupling unit are arranged point symmetrical with the center of a circuit.

14. The wideband interferometer type polarization beam combiner and splitter according to claim 1, wherein:
when $\psi_1(\lambda)$ is the sum total of the normalized phases of the optical splitting unit, the optical coupling unit, and the optical path length difference imparting unit of the first polarization state, and when $\psi_2(\lambda)$ is the sum total of the normalized phases of the optical splitting unit, the optical coupling unit, and the optical path length difference imparting unit of the second polarization state, the absolute values of the change rate of $\psi_1(\psi)$ and $\psi_2(\lambda)$ with respect to wavelength are the same and has opposite plus and minus signs;
the optical splitting unit is a Y-branch splitter, the optical coupling unit is an optical coupler, and a splitting ratio for the optical splitting unit and a coupling ratio for the optical coupling unit are 50%, regardless of the wavelength.

15. The wideband interferometer type polarization beam combiner and splitter according to claim 1, wherein:

the optical splitting unit and the optical coupling unit are wavelength insensitive couplers, each of which includes two directional couplers and an optical path length difference imparting unit formed of two optical waveguides arranged between the two directional couplers; and the wavelength insensitive couplers employed as the optical splitting unit and the optical coupling unit are arranged point symmetrical with the center of a circuit.

16. The wideband interferometer type polarization beam combiner and splitter according to claim 1, wherein the optical splitting unit is a Y-branch splitter, the optical coupling unit is an optical coupler, and a splitting ratio for the optical splitting unit and a coupling ratio for the optical coupling unit are 50%, regardless of the wavelength.

* * * * *

UNITED STATES PATENT AND TRADEMARK OFFICE
CERTIFICATE OF CORRECTION

PATENT NO.         : 8,787,710 B2
APPLICATION NO.    : 13/321780
DATED              : July 22, 2014
INVENTOR(S)        : Mizuno et al.

It is certified that error appears in the above-identified patent and that said Letters Patent is hereby corrected as shown below:

On the Title page, Item (54) and in the Specification, Col. 1
Title, change "WIDEBAND INTERFEROMETER TYPE POLARIZATION LIGHT BEAM COMBINER AND SPLITTER" to --WIDEBAND INTERFEROMETER TYPE POLARIZATION BEAM COMBINER AND SPLITTER--

Signed and Sealed this
Eleventh Day of November, 2014

Michelle K. Lee
*Deputy Director of the United States Patent and Trademark Office*